US009268427B2

(12) United States Patent
Yousefpor et al.

(10) Patent No.: US 9,268,427 B2
(45) Date of Patent: Feb. 23, 2016

(54) MULTI-MODE VOLTAGES FOR TOUCHSCREENS

(75) Inventors: Marduke Yousefpor, San Jose, CA (US); Kevin J. White, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/244,031

(22) Filed: Sep. 23, 2011

(65) Prior Publication Data

US 2013/0076647 A1    Mar. 28, 2013

(51) Int. Cl.
*G06F 3/041* (2006.01)
*G06F 3/045* (2006.01)
*G06F 3/044* (2006.01)

(52) U.S. Cl.
CPC .............. *G06F 3/0412* (2013.01); *G06F 3/044* (2013.01); *G06F 3/0418* (2013.01)

(58) Field of Classification Search
None
See application file for complete search history.

(56) References Cited

U.S. PATENT DOCUMENTS

| 5,483,261 | A  | 1/1996  | Yasutake |
| 5,488,204 | A  | 1/1996  | Mead et al. |
| 5,825,352 | A  | 10/1998 | Bisset et al. |
| 5,835,079 | A  | 11/1998 | Shieh |
| 5,880,411 | A  | 3/1999  | Gillespie et al. |
| 6,188,391 | B1 | 2/2001  | Seely et al. |
| 6,310,610 | B1 | 10/2001 | Beaton et al. |
| 6,323,846 | B1 | 11/2001 | Westerman et al. |
| 6,690,387 | B2 | 2/2004  | Zimmerman et al. |
| 7,015,894 | B2 | 3/2006  | Morohoshi |
| 7,184,064 | B2 | 2/2007  | Zimmerman et al. |
| 7,663,607 | B2 | 2/2010  | Hotelling et al. |
| 8,479,122 | B2 | 7/2013  | Hotelling et al. |
| 2005/0179040 | A1* | 8/2005 | Tanaka ........................... 257/72 |
| 2006/0026521 | A1 | 2/2006  | Hotelling et al. |
| 2006/0197753 | A1 | 9/2006  | Hotelling |
| 2008/0062139 | A1* | 3/2008  | Hotelling et al. ............. 345/173 |

(Continued)

FOREIGN PATENT DOCUMENTS

| GB | 2 475 054 A   | 5/2011 |
| JP | 2000-163031 A | 6/2000 |

(Continued)

OTHER PUBLICATIONS

International Search Report mailed Nov. 8, 2012, for PCT Application No. PCT/US2012/052933, filed Aug. 29, 2012, five pages.

(Continued)

*Primary Examiner* — Alexander Eisen
*Assistant Examiner* — Nan-Ying Yang
(74) *Attorney, Agent, or Firm* — Morrison & Foerster LLP

(57) ABSTRACT

Operating touch screens by applying more than one voltage modes, including a first voltage mode corresponding to a display phase and a second voltage mode corresponding to a touch sensing phase, is provided. An integrated touch screen device can include a multi-mode power system that can select a first voltage mode corresponding a display phase and a second voltage mode corresponding to a touch sensing phase. Each of one or more voltages can be applied to the touch screen at the corresponding first voltage level during the updating of the image. A touch sensing system can sense touch during a touch sensing phase. Each of one or more voltages can be applied to the touch screen at the corresponding second voltage level during the sensing of touch.

30 Claims, 14 Drawing Sheets

(56) References Cited

U.S. PATENT DOCUMENTS

| | | |
|---|---|---|
| 2009/0040192 A1* | 2/2009 | Haga .............................. 345/174 |
| 2010/0066692 A1 | 3/2010 | Noguchi et al. |
| 2010/0148813 A1* | 6/2010 | Erickson ....................... 324/758 |
| 2010/0253638 A1 | 10/2010 | Yousefpor et al. |
| 2011/0210938 A1 | 9/2011 | Kuang et al. |

FOREIGN PATENT DOCUMENTS

| | | |
|---|---|---|
| JP | 2002-342033 A | 11/2002 |
| WO | WO-2013/043336 A1 | 3/2013 |

OTHER PUBLICATIONS

Search Report dated Jul. 24, 2104, for ROC (Taiwan) Patent Application No. 101133192, with English Translation, two pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

MULTI-MODE VOLTAGES FOR TOUCHSCREENS

FIELD OF THE DISCLOSURE

This relates generally to touch sensing, and more particularly, to applying one or more voltages at different levels during different of operational phases of a touch screen.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing fields used to detect touch can extend beyond the surface of the display, and objects approaching near the surface may be detected near the surface without actually touching the surface.

Capacitive touch sensor panels can be formed from a matrix of drive and sense lines of a substantially transparent conductive material, such as Indium Tin Oxide (ITO), often arranged in rows and columns in horizontal and vertical directions on a substantially transparent substrate. It is due in part to their substantial transparency that capacitive touch sensor panels can be overlaid on a display to form a touch screen, as described above. Some touch screens can be formed by integrating touch sensing circuitry into a display pixel stackup (i.e., the stacked material layers forming the display pixels).

SUMMARY

The following description includes examples of operating touch screens by applying more than one voltage modes, including a first voltage mode corresponding to a display phase and a second voltage mode corresponding to a touch sensing phase. An integrated touch screen device can include a touch screen including a plurality of display pixels. A multi-mode power system can select a first voltage mode corresponding a display phase and a second voltage mode corresponding to a touch sensing phase. The first voltage mode can include a first voltage level for each of one or more voltages of the touch screen, and the second voltage mode can include a second voltage level for each of the one or more voltages, each second voltage level being different than the corresponding first voltage level. A display system can update an image displayed by the display pixels during the display phase. Each of the one or more voltages can be applied to the touch screen at the corresponding first voltage level during the updating of the image. A touch sensing system can sense touch during a touch sensing phase. Each of the one or more voltages can be applied to the touch screen at the corresponding second voltage level during the sensing of touch. In this way, for example, crosstalk between, for example, the display system and the touch sensing system, can be reduced.

DETAILED DESCRIPTION

Figure 1C:
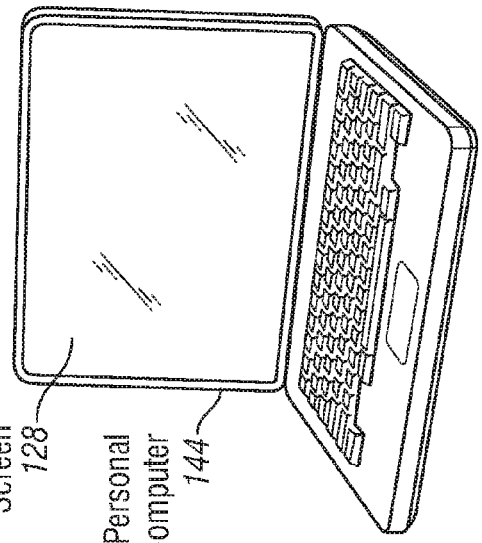
FIGS. 1A-1C illustrate an example mobile telephone, an example media player, and an example personal computer that each include an example touch screen according to embodiments of the disclosure.

In the following description of example embodiments, reference is made to the accompanying drawings which form a part hereof, and in which it is shown by way of illustration specific embodiments in which embodiments of the disclosure can be practiced. It is to be understood that other embodiments can be used and structural changes can be made without departing from the scope of the embodiments of this disclosure.

The following description includes examples of operating touch screens by applying more than one voltage modes, including a first voltage mode corresponding to a display phase and a second voltage mode corresponding to a touch sensing phase. Multi-mode voltages can help reduce crosstalk between, for example, the display system and the touch sensing system. Reducing crosstalk can be beneficial because crosstalk can introduce errors in, for example, touch sensing signals of the touch sensing system. Touch sensing circuitry in devices such as touch panels, touch screens, etc., can be exposed to various sources of error that can enter the touch sensing system through various error mechanisms. For example, touch sensing circuitry can operate alongside other types of circuitry, such as in a touch screen formed by a touch panel overlay on a display screen. Close proximity of touch and display circuitry may cause undesirable interference, such as crosstalk, with touch sensing. Sources of error can enter the touch sensing system through mechanisms.

Errors in touch sensing can include any portion of a touch sensing measurement that does not carry information about touch. A touch sensing signal output from a touch sensor can be a composite signal, for example, that includes one or more signals caused by a touch, and carrying touch information about the touch, and one or more signals caused by other sources, such as electrical interference, crosstalk, etc., that do not provide information about the touch. Some error sources can cause a change in the operation of touch sensing that causes the portion of the touch sensing signal that carries touch information to inaccurately reflect the amount of touch.

As touch sensing circuitry becomes more closely integrated with circuitry of other systems, undesirable interaction between circuit elements of different systems can be more likely to occur. For example, touch sensing circuitry can be integrated into the display pixel stackups of integrated touch screens. Display pixel stackups are typically manufactured by processes including depositing, masking, etching, doping, etc., of materials such as conductive materials (e.g., metal, substantially transparent conductors), semiconductive materials (e.g., polycrystalline silicon (Poly-Si)), and dielectric materials (e.g., SiO2, organic materials, SiNx). Various elements formed within a display pixel stackup can operate as circuitry of the display system to generate an image on the display, while other elements can operate as circuitry of a touch sensing system that senses one or more touches on or near the display.

Figure 6:
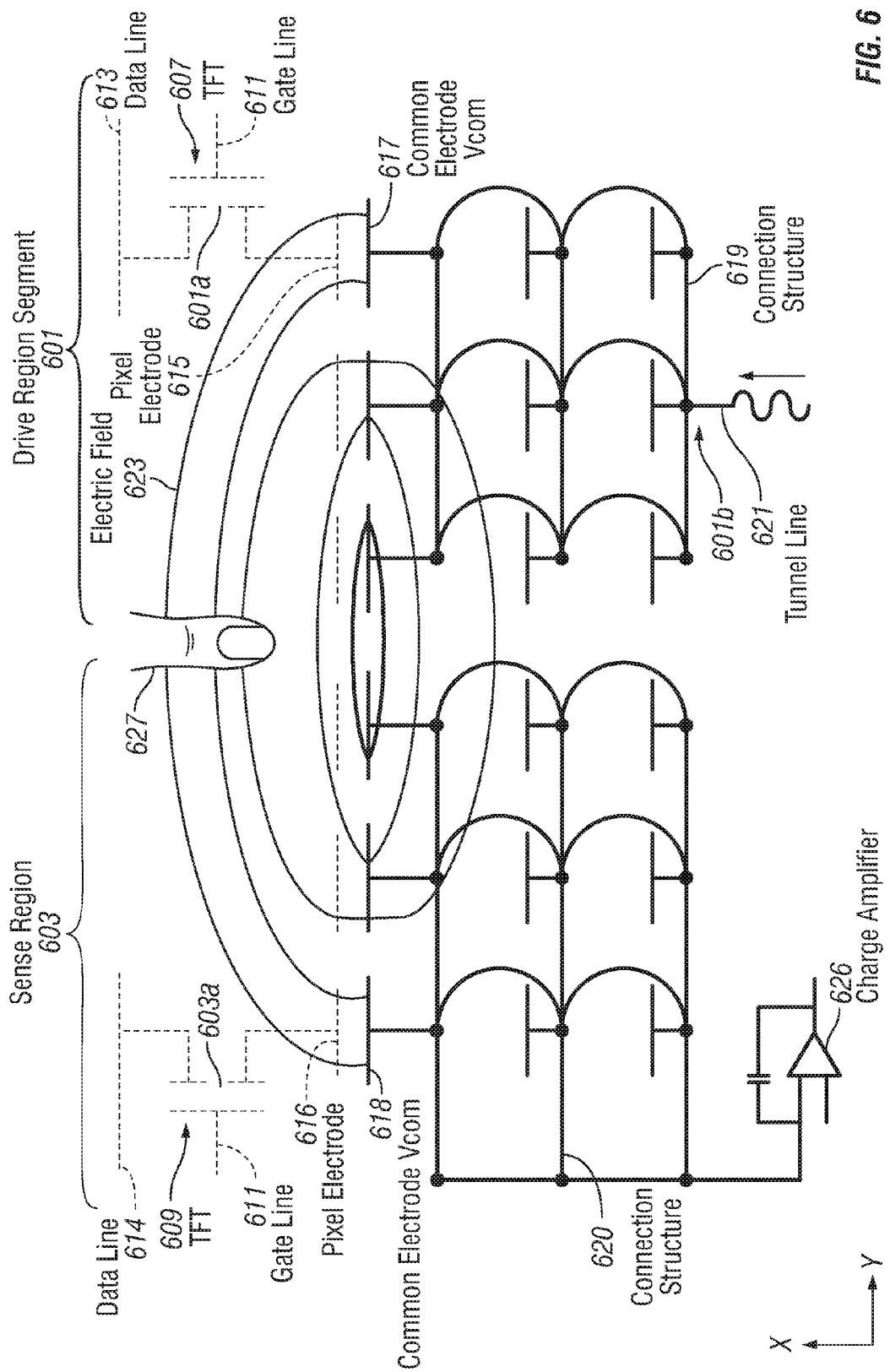
FIG. 6 illustrates an example touch sensing operation according to embodiments of the disclosure.
Figure 7:
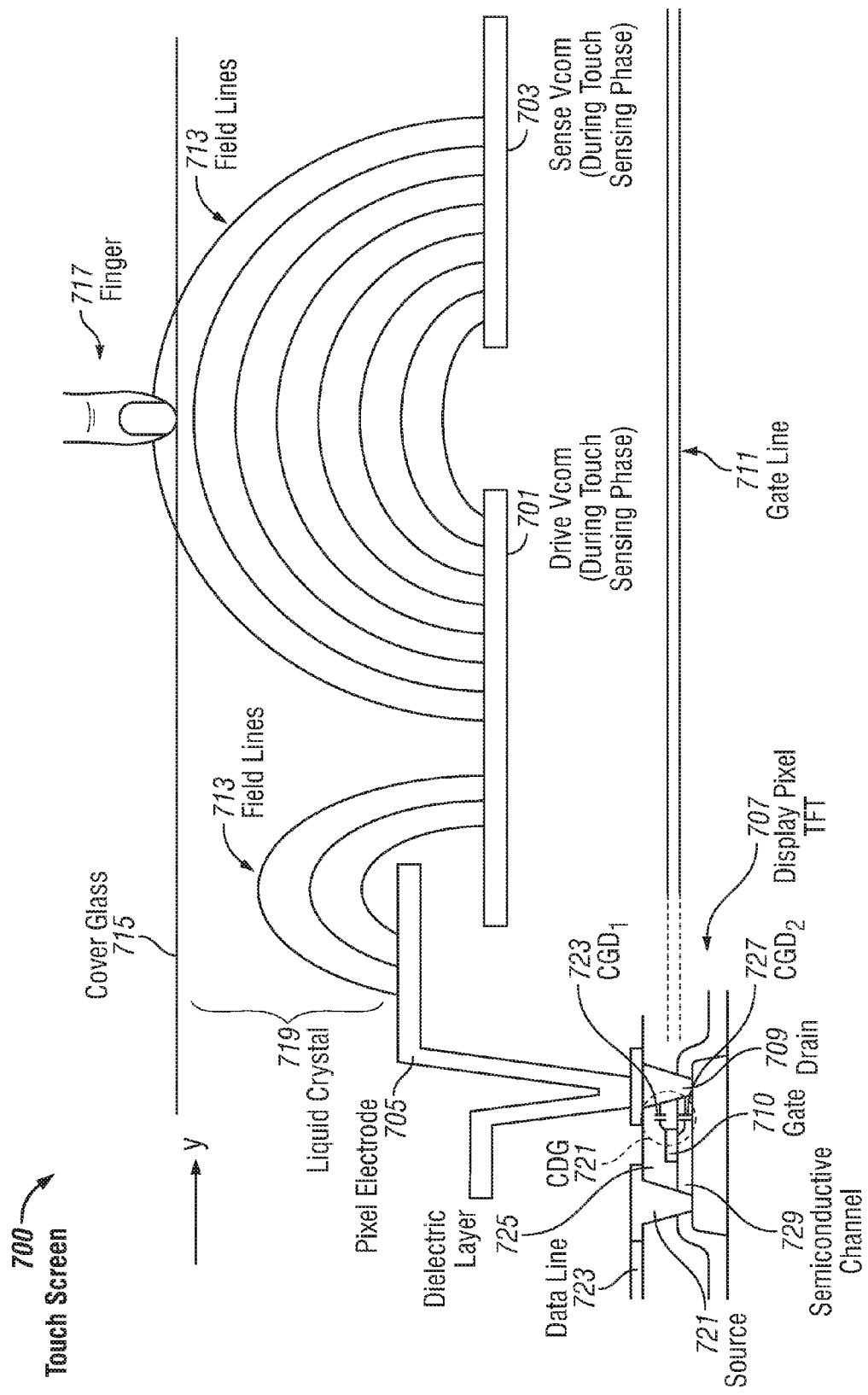
FIG. 7 illustrates a portion of an example touch screen during a touch sensing phase according to embodiments of the disclosure.
Figure 8:
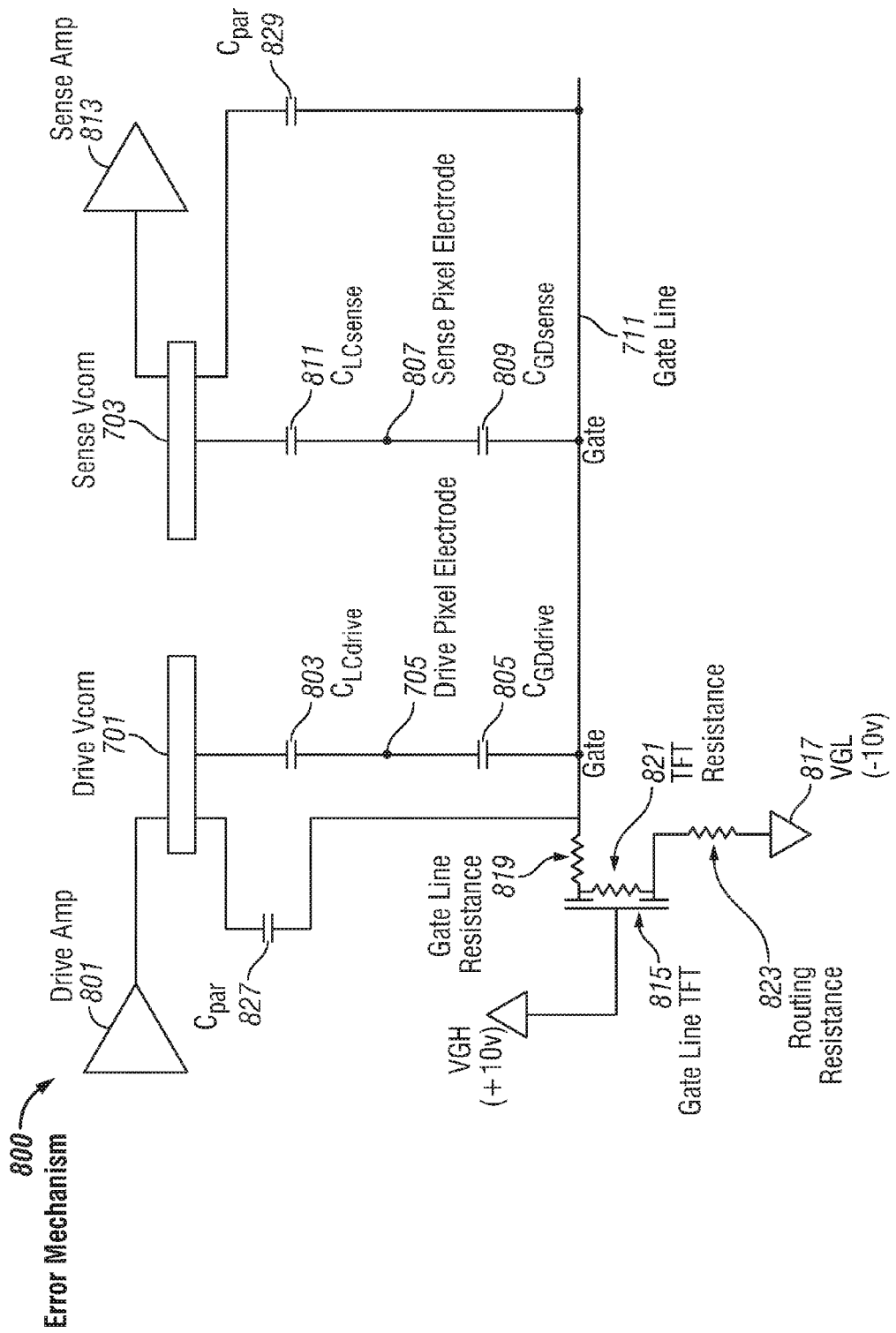
FIG. 8 illustrates a model of an example error mechanism in an example touch screen according to embodiments of the disclosure.
Figure 9:
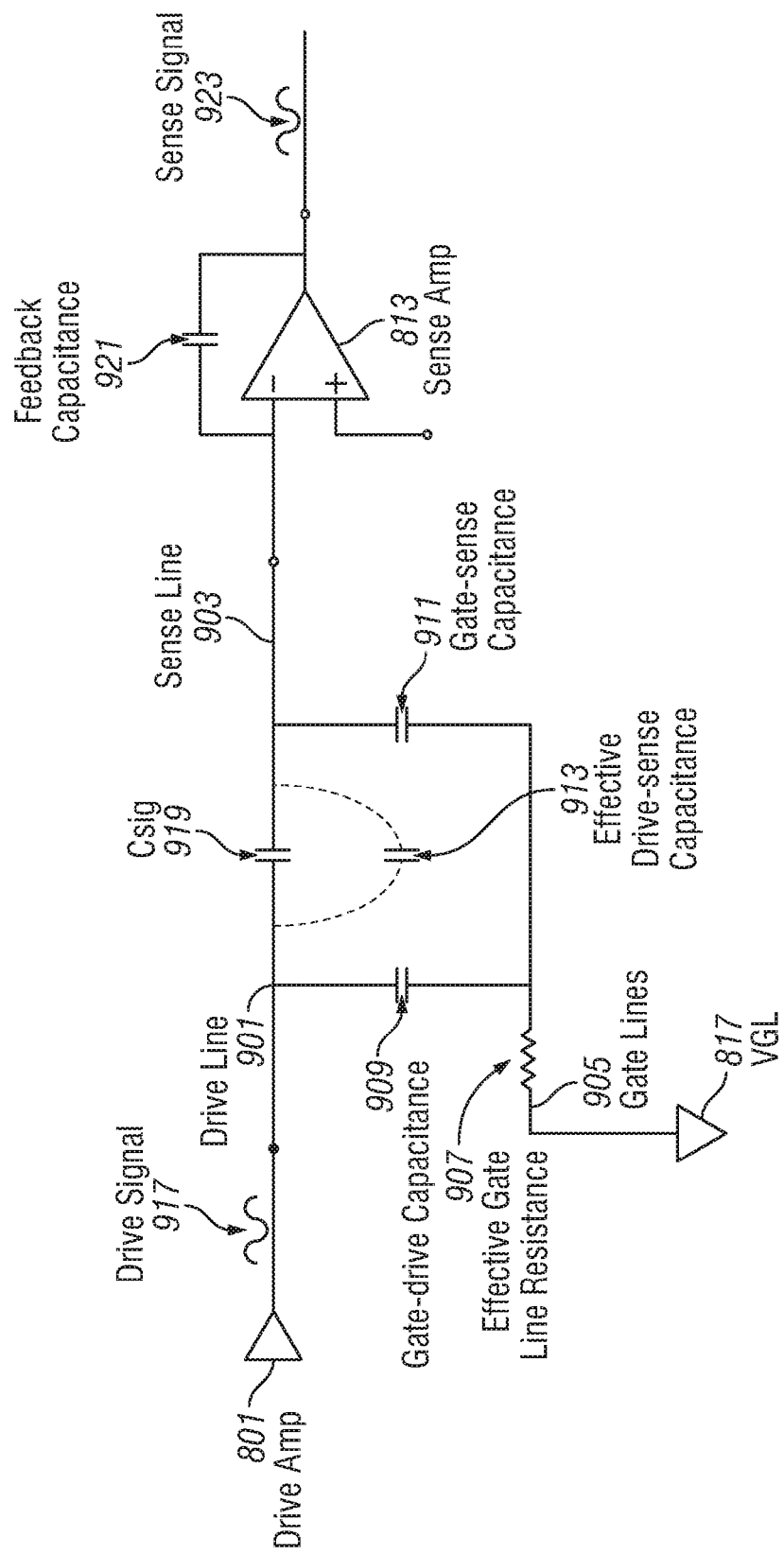
FIG. 9 illustrates a circuit diagram of a drive-sense operation of an example touch screen according to embodiments of the disclosure.

Some example systems in which a touch screen according to embodiments of the disclosure may be implemented will first be described in reference to FIGS. 1A-1C. Next, an example touch screen device that includes a discrete touch controller and a discrete LCD driver according to various embodiments will be described in reference to FIG. 2, and further details of example physical structures (FIGS. 3-5) and touch sensing operation (FIG. 6) of an integrated touch screen according to embodiments of the disclosure will be described. Next, FIGS. 7-9 illustrate an example of an error mechanism that can affect touch sensing, and the error mechanism can depend on electrical characteristics, such as capacitance, of components of the system, such as transistors. In particular, the error mechanism can depend on electrical characteristics that are voltage-dependent, such that the electrical characteristics of the components can be adjusted by changing a voltage applied to the component, for example. Next, an example touch screen device that includes a combination display and touch controller according to various embodiments will be described with reference to FIG. 10. Then, an example method of operating a touch screen using different voltage level settings for a display phase and a touch sensing phase according to various embodiments will be described in reference to FIGS. 11-14.

Figure 1B:
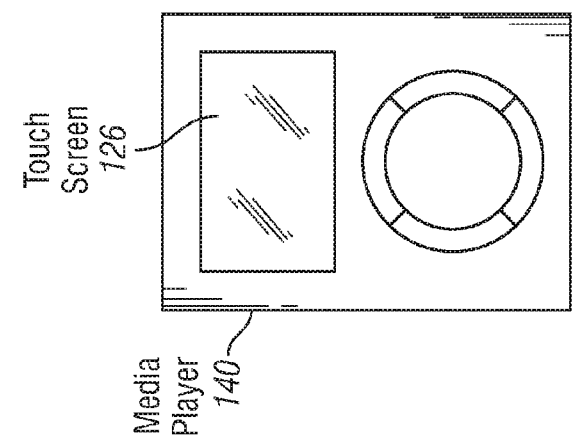
Figure 1A:
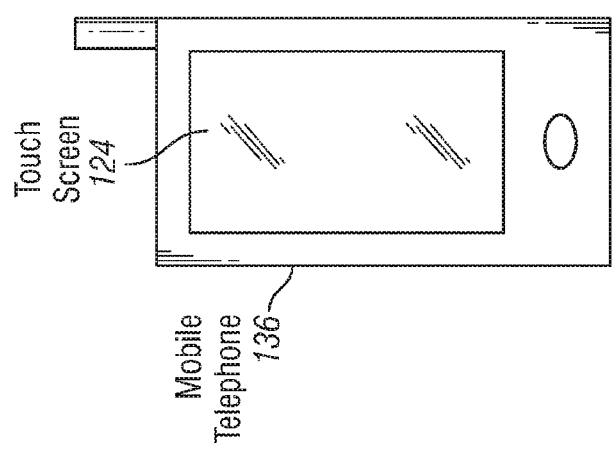

FIGS. 1A-1C show example systems in which a touch screen according to embodiments of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. Although not shown in the figures, the personal computer 144 can also be a tablet computer or a desktop computer with a touch-sensitive display. Touch screens 124, 126, and 128 may be based on, for example, self capacitance or mutual capacitance, or another touch sensing technology. For example, in a self capacitance based touch system, an individual electrode with a self-capacitance to ground can be used to form a touch pixel for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen. A mutual capacitance based touch system can include, for example, drive regions and sense regions, such as drive lines and sense lines. For example, drive lines can be formed in rows while sense lines can be formed in columns (e.g., orthogonal). Touch pixels can be formed at the intersections of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some embodiments, a touch screen can be multi-touch, single touch, projection scan, full-imaging multi-touch, or any capacitive touch.

Figure 2:
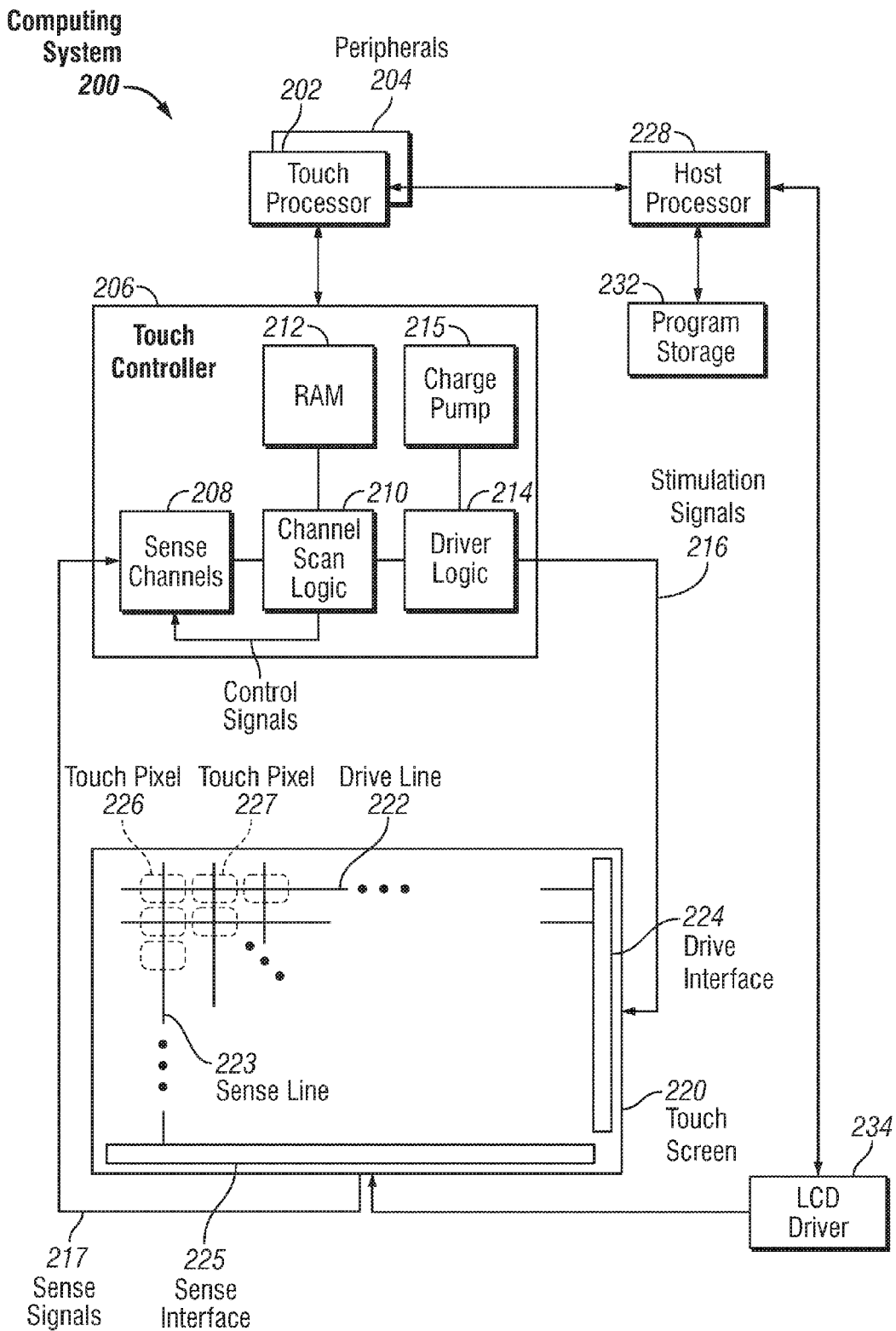
FIG. 2 is a block diagram of an example computing system that illustrates one implementation of an example touch screen according to embodiments of the disclosure.

FIG. 2 is a block diagram of an example computing system 200 that illustrates one implementation of an example touch screen 220 according to embodiments of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 that can be selectively applied to drive regions of the touch sensing circuitry of touch screen 220, as described in more detail below. In some embodiments, touch controller 206, touch processor 202 and peripherals 204 can be integrated into a single application specific integrated circuit (ASIC).

Computing system 200 can also include a host processor 228 for receiving outputs from touch processor 202 and performing actions based on the outputs. For example, host processor 228 can be connected to program storage 232 and a display controller, such as an LCD driver 234. Host processor 228 can use LCD driver 234 to generate an image on touch screen 220, such as an image of a user interface (UI), and can use touch processor 202 and touch controller 206 to detect a touch on or near touch screen 220, such a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that can include a capacitive sensing medium having a plurality of drive lines 222 and a plurality of sense lines 223. It should be noted that the term "lines" is a sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g. a pattern of fingers touching the touch screen).

Figure 3:
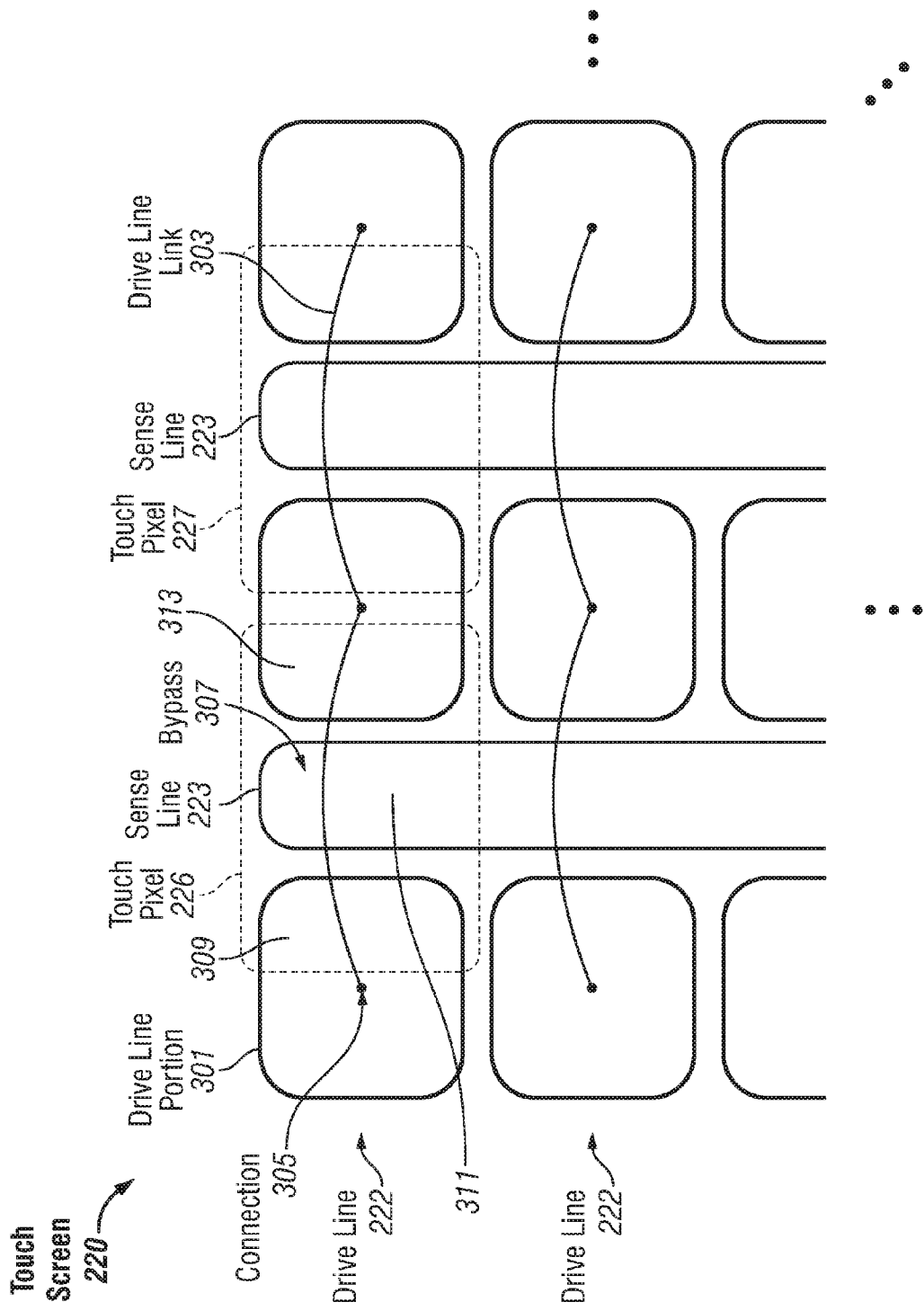
FIG. 3 is a more detailed view of the touch screen of FIG. 2 showing an example configuration of drive lines and sense lines according to embodiments of the disclosure.

Touch screen 220 can be an integrated touch screen in which touch sensing circuit elements of the touch sensing system can be integrated into the display pixel stackups of a display. An example integrated touch screen in which embodiments of the disclosure can be implemented with now be described with reference to FIGS. 3-6. FIG. 3 is a more detailed view of touch screen 220 showing an example configuration of drive lines 222 and sense lines 223 according to embodiments of the disclosure. As shown in FIG. 3, each drive line 222 can be formed of one or more drive line segments 301 that can be electrically connected by drive line links 303 at connections 305. Drive line links 303 are not electrically connected to sense lines 223, rather, the drive line links can bypass the sense lines through bypasses 307. Drive lines 222 and sense lines 223 can interact capacitively to form touch pixels such as touch pixels 226 and 227. Drive lines 222 (i.e., drive line segments 301 and corresponding drive line links 303) and sense lines 223 can be formed of electrical circuit elements in touch screen 220. In the example configuration of FIG. 3, each of touch pixels 226 and 227 can include a portion of one drive line segment 301, a portion of a sense line 223, and a portion of another drive line segment 301. For example, touch pixel 226 can include a right-half portion 309 of a drive line segment on one side of a portion 311 of a sense line, and a left-half portion 313 of a drive line segment on the opposite side of portion 311 of the sense line.

Figure 4:
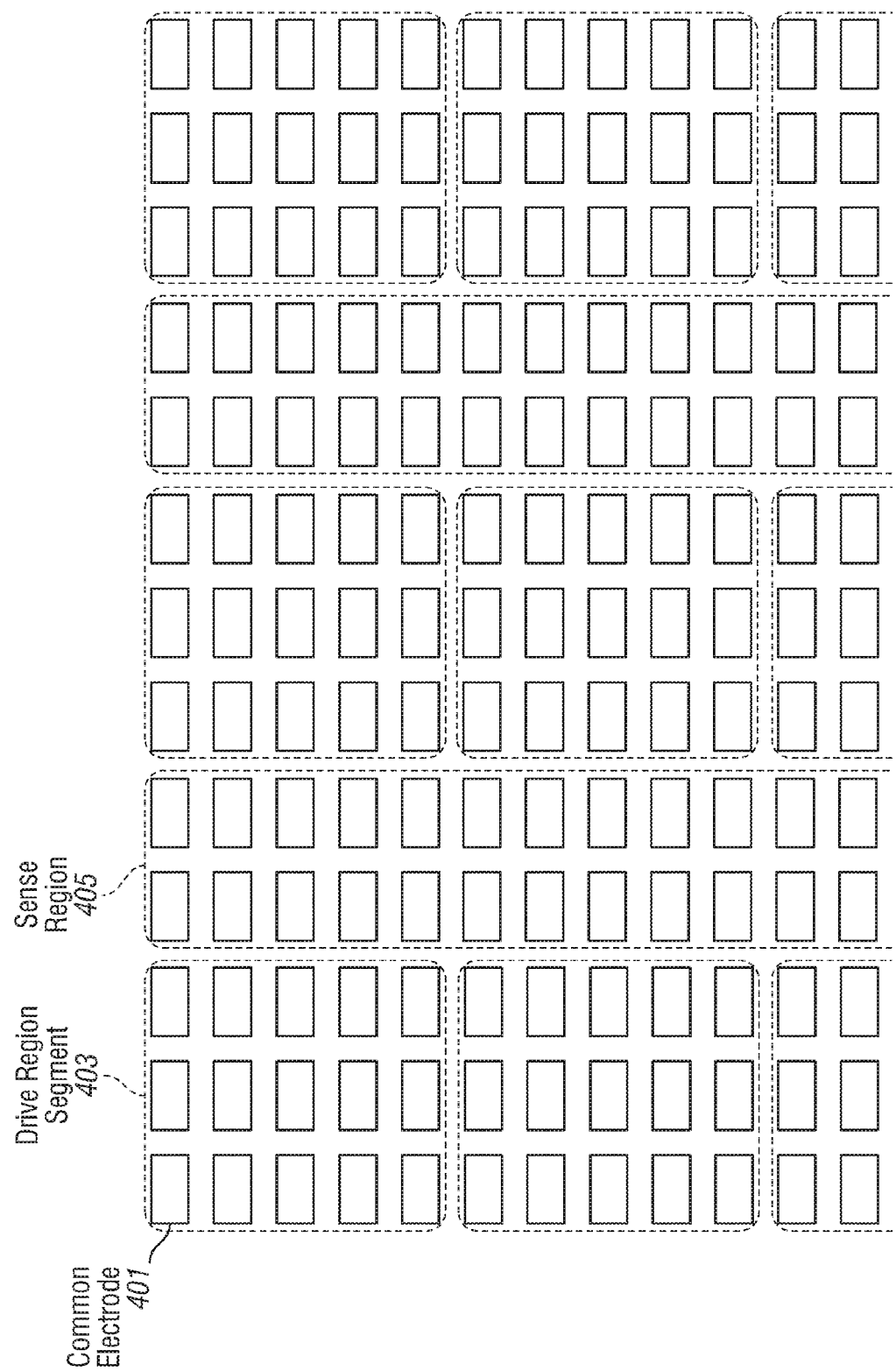
FIG. 4 illustrates an example configuration in which touch sensing circuitry includes common electrodes (Vcom) according to embodiments of the disclosure.

The circuit elements can include, for example, elements that can exist in conventional LCD displays, as described above. It is noted that circuit elements are not limited to whole circuit components, such a whole capacitor, a whole transistor, etc., but can include portions of circuitry, such as only one of the two plates of a parallel plate capacitor. FIG. 4 illustrates an example configuration in which common electrodes (Vcom) can form portions of the touch sensing circuitry of a touch sensing system. Each display pixel includes a common electrode 401, which is a circuit element of the display system circuitry in the pixel stackup (i.e., the stacked material layers forming the display pixels) of the display pixels of some types of conventional LCD displays, e.g., fringe field switching (FFS) displays, that can operate as part of the display system to display an image.

In the example shown in FIG. 4, each common electrode (Vcom) 401 can serve as a multi-function circuit element that can operate as display circuitry of the display system of touch screen 220 and can also operate as touch sensing circuitry of the touch sensing system. In this example, each common electrode 401 can operate as a common electrode of the display circuitry of the touch screen, and can also operate together when grouped with other common electrodes as touch sensing circuitry of the touch screen. For example, a group of common electrodes 401 can operate together as a capacitive part of a drive line or a sense line of the touch sensing circuitry during the touch sensing phase. Other circuit elements of touch screen 220 can form part of the touch sensing circuitry by, for example, electrically connecting together common electrodes 401 of a region, switching electrical connections, etc.

In addition, although example embodiments herein may describe the display circuitry as operating during a display phase, and describe the touch sensing circuitry as operating during a touch sensing phase, it should be understood that a display phase and a touch sensing phase may partially overlap, or the display phase and touch phase may operate at different times.

For example, FIG. 4 shows common electrodes 401 grouped together to form drive region segments 403 and sense regions 405 that generally correspond to drive line segments 301 and sense lines 223, respectively. Grouping multi-function circuit elements of display pixels into a region can mean operating the multi-function circuit elements of the display pixels together to perform a common function of the region. Grouping into functional regions may be accomplished through one or a combination of approaches, for example, the structural configuration of the system (e.g., physical breaks and bypasses, voltage line configurations), the operational configuration of the system (e.g., switching circuit elements on/off, changing voltage levels and/or signals on voltage lines), etc.

Multi-function circuit elements of display pixels of the touch screen can operate in both the display phase and the touch phase. For example, during a touch phase, common electrodes 401 can be grouped together to form touch signal lines, such as drive regions and sense regions. In some embodiments circuit elements can be grouped to form a continuous touch signal line of one type and a segmented touch signal line of another type. For example, FIG. 4 shows one example embodiment in which drive region segments 403 and sense regions 405 correspond to drive line segments 301 and sense lines 223 of touch screen 220. Other configurations are possible in other embodiments; for example, common electrodes 401 could be grouped together such that drive lines are each formed of a continuous drive region and sense lines are each formed of a plurality of sense region segments linked together through connections that bypass a drive region.

Figure 5:
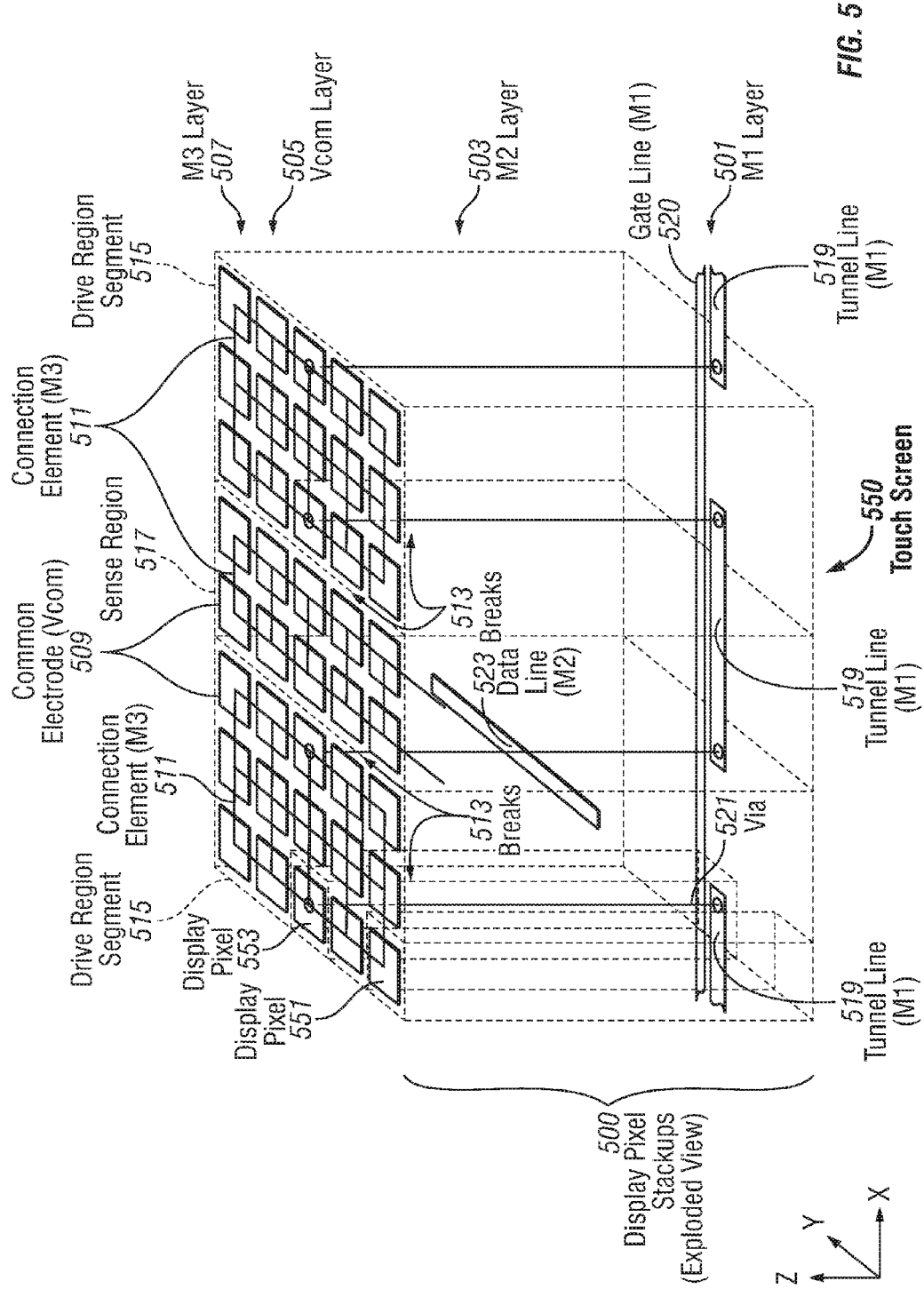
FIG. 5 illustrates an exploded view of example display pixel stackups according to embodiments of the disclosure.

FIG. 5 is a three-dimensional illustration of an exploded view (expanded in the z-direction) of example display pixel stackups 500 showing some of the elements within the pixel stackups of an example integrated touch screen 550. Stackups 500 can include a configuration of conductive lines that can be used to group common electrodes, such as common electrodes 401, into drive region segments and sense regions, such as shown in FIG. 4, and to link drive region segments to form drive lines.

Stackups 500 can include elements in a first metal (M1) layer 501, a second metal (M2) layer 503, a common electrode (Vcom) layer 505, and a third metal (M3) layer 507. Each display pixel can include a common electrode 509, such as common electrodes 401 in FIG. 4, that is formed in Vcom layer 505. M3 layer 507 can include connection element 511 that can electrically connect together common electrodes 509. In some display pixels, breaks 513 can be included in connection element 511 to separate different groups of common electrodes 509 to form drive region segments 515 and a sense region 517, such as drive region segments 403 and sense region 405, respectively. Breaks 513 can include breaks in the x-direction that can separate drive region segments 515 from sense region 517, and breaks in the y-direction that can separate one drive region segment 515 from another drive region segment. M1 layer 501 can include tunnel lines 519 that can electrically connect together drive region segments 515 through connections, such as conductive vias 521, which can electrically connect tunnel line 519 to the grouped common electrodes in drive region segment display pixels. Tunnel line 519 can run through the display pixels in sense region 517 with no connections to the grouped common electrodes in the sense region, e.g., no vias 521 in the sense region. The M1 layer can also include gate lines 520. M2 layer 503 can include data lines 523. Only one gate line 520 and one data line 523 are shown for the sake of clarity; however, a touch screen can include a gate line running through each horizontal row of display pixels and multiple data lines running through each vertical row of display pixels, for example, one data line for each red, green, blue (RGB) color sub-pixel in each pixel in a vertical row of an RGB display integrated touch screen.

Structures such as connection elements 511, tunnel lines 519, and conductive vias 521 can operate as a touch sensing circuitry of a touch sensing system to detect touch during a touch sensing phase of the touch screen. Structures such as data lines 523, along with other pixel stackup elements such as transistors, pixel electrodes, common voltage lines, data lines, etc. (not shown), can operate as display circuitry of a display system to display an image on the touch screen during a display phase. Structures such as common electrodes 509 can operate as multifunction circuit elements that can operate as part of both the touch sensing system and the display system.

When touch sensing is occurring in the touch sensing phase, some circuit elements, such as some of the circuit elements of the display system, can be deactivated, electrically isolated, clamped, stabilized, etc., so that the circuit elements do not interfere with touch sensing. For example, during a touch sensing phase, gate lines 520 can be held to a fixed voltage that switches associated pixel transistors to an off state. With the pixel transistors in the off state, stimulation signals can be transmitted through a row of drive region segments 515 connected by tunnel lines 519 and conductive vias 521 to form electric fields between the stimulated drive region segments and sense region 517 to create touch pixels, such as touch pixel 226 in FIG. 2. In this way, the row of connected together drive region segments 515 can operate as a drive line, such as drive line 222, and sense region 517 can operate as a sense line, such as sense line 223.

A touch sensing operation according to embodiments of the disclosure will be described with reference to FIG. 6. FIG. 6 shows partial circuit diagrams of some of the touch sensing circuitry within display pixels in a drive region segment 601 and a sense region 603 of an example touch screen according to embodiments of the disclosure. For the sake of clarity, only one drive region segment is shown. Also for the sake of clarity, FIG. 6 includes circuit elements illustrated with dashed lines to signify some circuit elements operate primarily as part of the display circuitry and not the touch sensing circuitry. In addition, a touch sensing operation is described primarily in terms of a single display pixel 601a of drive region segment 601 and a single display pixel 603a of sense region 603. However, it is understood that other display pixels in drive region segment 601 can include the same touch sensing circuitry as described below for display pixel 601a, and the other display pixels in sense region 603 can include the same touch sensing circuitry as described below for display pixel 603a. Thus, the description of the operation of display pixel 601a and display pixel 603a can be considered as a description of the operation of drive region segment 601 and sense region 603, respectively.

Referring to FIG. 6, drive region segment 601 includes a plurality of display pixels including display pixel 601a. Display pixel 601a can include a TFT 607, a gate line 611, a data line 613, a pixel electrode 615, and a common electrode 617. FIG. 6 shows common electrode 617 connected to the common electrodes in other display pixels in drive region segment 601 through a connection element 619 within the display pixels of drive region segment 601 that is used for touch sensing as described in more detail below. Sense region 603 includes a plurality of display pixels including display pixel 603a. Display pixel 603a includes a TFT 609, a data line 614, a pixel electrode 616, and a common electrode 618. TFT 609 can be connected to the same gate line 611 as TFT 607. FIG. 6 shows common electrode 618 connected to the common electrodes in other display pixels in sense region 603 through a connection element 620 that can be connected, for example, in a border region of the touch screen to form an element within the display pixels of sense region 603 that is used for touch sensing as described in more detail below.

During a touch sensing phase, gate line 611 can be connected to a voltage source, such as a charge pump, that can apply a voltage to maintain TFTs 609 in the off state. Drive signals can be applied to common electrodes 617 through a tunnel line 621 that is electrically connected to a portion of connection element 619 within a display pixel 601b of drive region segment 601. The drive signals, which are transmitted to all common electrodes 617 of the display pixels in drive region segment 601 through connection element 619, can generate an electrical field 623 between the common electrodes of the drive region segment and common electrodes 618 of sense region 603, which can be connected to a sense amplifier, such as a charge amplifier 626. Electrical charge can be injected into the structure of connected common electrodes of sense region 603, and charge amplifier 626 converts the injected charge into a voltage that can be measured. The amount of charge injected, and consequently the measured voltage, can depend on the proximity of a touch object, such as a finger 627, to the drive and sense regions. In this way, the measured voltage can provide an indication of touch on or near the touch screen.

As touch sensing circuitry becomes more closely integrated with circuitry of other systems, such as in the example integrated touch screen described in FIGS. 3-6 above, undesirable interaction between circuit elements of different systems can be more likely to occur. FIG. 7 illustrates one example structure of a portion of a touch screen according to embodiments of the disclosure. The example structure includes circuit elements with electrical properties, e.g., a gate-to-drain capacitance of a transistor, that can contribute to errors in touch sensing. FIG. 7 shows a touch screen 700 that can include a drive Vcom 701, a sense Vcom 703, and a pixel electrode 705. The pixel electrode 705 can be connected to a display pixel TFT 707 through a drain 709. Display pixel TFT 707 can include a gate 710, which can be connected to a gate line 711. Gate line 711 can be connected to the gates of the pixel TFTs in other display pixels, including a display pixel that includes sense Vcom 703 (although the corresponding structures are not shown in the figure).

During a display phase, a pixel voltage can be applied to a source 721 of pixel TFT 707 by a data line 723. Pixel TFT 707 can be switched to an on state by an "on" voltage (e.g., +10V) applied to gate line 711, such that the pixel voltage of source 721 can be applied to pixel electrode 705 through drain 709. Pixel TFT 707 can then be switched to an off state by an "off" voltage (e.g., −10V) applied to gate line 711, such that pixel electrode 705 can be held at the pixel voltage to operate the pixel at the particular luminance required for that pixel in the current image. For example, the pixel voltage can range from zero volts (which can correspond to a minimum luminance, e.g., black) to +5V (which can correspond to a maximum luminance, e.g., white). In addition, some types of displays, such as liquid crystal displays, can employ inversion schemes that can periodically switch the polarity of the electrical potential between the pixel electrode and the Vcom. In some displays, for example, the polarity of the pixel voltage can alternate every other image frame (e.g., switching polarity 60 times per second for a display screen with a 60 Hz refresh rate). In the present example, the pixel voltage alternate polarity every other image frame, ranging from zero volts (black) to +5V (white) in one image frame, and ranging between zero volts (black) to −5V (white) in the next image frame.

The pixel voltage can cause an electrical field between drain 709 and gate 710. The electric field between can depend on the gate-to-drain voltage (VGD), i.e., the difference between the pixel voltage and the gate line voltage. For example, the VGD of a white pixel can be −15V [(−10V)−(+5V)] in one frame, and can be −5V [(−10V)−(−5V)] in the next frame. The VGD of a black pixel in this example can be −10V [(−10V)−(zero volts)] in one frame, and can be −10V [(−10V)−(zero volts)] in the next frame.

Some of the electrical field between drain 709 and gate 710 can extend through a portion of a semiconductor channel, such as a semiconductor channel 729, and can induce carrier generation in the semiconductor, thus changing the conductivity of the portion of the semiconductive channel between the drain and the gate. The changed conductivity corresponds to a changed dielectric constant of the portion of the semiconductive channel, which can change a capacitance associated with pixel TFT 707. Specifically, one of the electrical characteristics of pixel TFT 707 is a gate-to-drain capacitance (CGD) 721 that can include a combination of a capacitance (CGD1) 723 through a dielectric layer 725 of pixel TFT 707 and a capacitance (CGD2) 727 through a semiconductive channel 729 of the pixel TFT. The capacitance associated with a dielectric layer, such as dielectric layer 725, can be relatively independent of surrounding electrical fields. In this regard, the portion of the total gate-to-drain capacitance, CGD 721, that is associated with dielectric layer 725 can be relatively independent of an electric field between gate 710 and drain 709. In other words, CGD1 723 can remain relatively constant over a range of different pixel voltages that can be applied to pixel electrode 705 as different image frames are displayed on touch screen 700.

On the other hand, CGD2 727 represents the portion of the total gate-to-drain capacitance through a semiconductor, such as semiconductive channel 729. In some touch screens, CGD2 727 can be dependent on the pixel voltage of pixel electrode 705. In particular, a voltage difference between drain 709 (connected to pixel electrode 705) and gate 710 can create an electric field between drain 709 and gate 710. A portion of the electric field can extend through a region of semiconductive channel 729 and can induce carrier generation in the semiconductive channel. In other words, the electric field can generate electrons or holes in the region of the semiconductive channel, depending on the type of dopant of the semiconductor used in the region through which the electric field extends. The induced carrier generation can change the conductivity of the region of the semiconductive channel between gate 710 and drain 709, which can change the portion of the total the gate-to-drain capacitance associated with semiconductive channel 729, i.e., CGD2 727. The amount of induced carrier generation can depend on the strength of the electric field between drain 709 and gate 710, which in turn can depend on the pixel voltage applied to pixel electrode 705 during the updating of the image in the display phase. Because the pixel voltage applied to pixel electrode 705 can vary over time as different image frames are displayed on touch screen 700, total gate-to-drain capacitance, CGD 721, can vary over time. In addition, because pixel voltages applied to different pixel electrodes of touch screen 700 can be different in each image frame, the total gate-to-drain capacitances of the sub-pixels of the touch screen can be different for any given image frame. Differences in gate-to-drain capacitances over time and/or sub-pixel location can cause errors, such as errors in touch sensing.

For example, during the touch sensing phase, drive Vcom 701 can be driven by a drive signal, which can generate field lines 713. Some of field lines 713 can exit a cover glass 715 and reach finger 717. The field lines 713 that are affected by finger 717 can allow sense Vcom 703 to measure touch information. However, some of field lines 713 emitted from drive Vcom 701 can reach pixel electrode 705. Consequently, part of the drive signal that can be driving drive Vcom 701 can be picked up by pixel electrode 705, and this signal can be passed to gate line 711 through drain 709 because of the capacitive coupling, CGD 721, between the gate and the drain. The leaked drive signal can further be coupled into the touch sensing system, as will now be described in more detail with reference to FIGS. 8-9.

FIG. 8 illustrates further details of an error mechanism 800 that includes the example portion of touch screen 700 in FIG. 7. A drive amplifier 801 can drive the drive Vcom 701 with a drive signal as described above. A portion of the drive signal can be captured by pixel electrode 705 through field lines passing through liquid crystal 719. Liquid crystal 719 of display pixels in the drive region can have a capacitance, CLCdrive 803. Once captured by pixel electrode 705, the signal can be passed to gate line 711 through a capacitance between drain 709 and gate line 711, CGDdrive 805, which can vary depending on pixel voltage. Gate line 711 can be shared with the display pixels of the sense region, therefore the leaked drive signal may be coupled into the display pixels of the sense region through a similar mechanism shown in the figure. In particular, the signal can pass into sense pixel electrode 807 through a gate-to-drain capacitance CGDsense 809 of the TFTs in the display pixels of the sense region. The signal can then be passed from pixel electrode 807 to sense Vcom 703 through the liquid crystal 719 of the sense region display pixels, the liquid crystal having an associated capacitance CLCsense 811. In other words, the signal can be transmitted through an electrical pathway including drive pixel electrode 705, the capacitive coupling CGDdrive 805 of a pixel TFT, gate line 711, the capacitive coupling CGD sense 809 of another pixel TFT, and sense pixel electrode 807. The leaked signal can show up in the touch measurements detected by sense amplifier 813.

FIG. 9 illustrates an example circuit diagram of the example touch screen configuration 700 shown in FIG. 7. FIG. 9 includes the example error mechanism 800 of FIG. 8. In the previous examples of FIGS. 7 and 8, for the sake of clarity, only one drive Vcom/sense Vcom pair is described. However, as shown in the example embodiments described in FIGS. 4-6, the drive lines and sense lines of an integrated touch screen can include the Vcoms of multiple display pixels grouped together in a region of the touch screen. In the example circuit diagram of FIG. 9, a drive line 901 can include drive region segments such as drive region segment 403 linked together with bypasses as described in FIGS. 3 and 5, and a sense line 903 can include a sense region such as sense region 405 including a sense region such as sense region 405, including electrically connected together Vcoms of display pixels in the sense region as described in the figures. Gate lines 905 can include multiple gate lines such as gate lines 711 running through multiple rows of display pixels in the drive line 901 and portion of the sense line 903. For example, there may be 60 gate lines 905 in each drive line 901. An effective gate line resistance 907 can include a combination of resistances associated with the multiple gate lines 905, such as gate line resistance 819, TFT resistance 821, and routing resistance 823 of each of the 60 gate lines, for example. Likewise, a gate-drive capacitance 909 can include a combination of various capacitances between the multiple drive Vcom 701 and each corresponding gate line 905. For example, gate-drive capacitance 909 can include a combination of the CLCdrive 803 and CGDdrive 805 of each display pixel in the drive region. Likewise, a gate-sense capacitance 911 can include a combination of the CLCsense 811 and CGDsense 809 of all of the display pixels in the sense region. Effective drive-sense capacitance 913 can, therefore, represent the total effective capacitance between the drive and sense regions due to the various capacitances associated with each of the display pixels in the regions.

Drive amplifier 801 can generate a drive signal 917 on drive line 901 that can emanate from the multiple drive Vcoms in the drive region. The signal emanating from the drive Vcoms can be received through a touch-sensing mechanism to generate a signal capacitance, CSIG 919. The touch-sensing mechanism can include sense line 903 and sense amplifier 813, with feedback capacitance 921, that can amplify the received signal to result in a sense signal 923 representing touch information received by the sense line. The signal emanating from the drive Vcoms can also be received by sense line 903 through the various error mechanisms of error mechanism 800, which can result in an error represented by effective drive-sense capacitance 913. In other words, a portion of the drive signal can reach sense line 903 through various error mechanisms. Therefore, sense signal 923 can be a superposition of multiple CSIG signals 919, which can carry touch information, together with some amount of drive signal 917, for example, that can travel through error mechanism 800, without acquiring touch information. The leaked drive signal 917 through error mechanism 800 can degrade touch sensing due to the amount of the leaked drive signal and due to variations in the amount of the leaked drive signal.

The amount of the leaked drive signal 917 can affect touch sensing because, for example, as the amount of the leaked drive signal 917 increases, the proportion of sense signal 923 that carries touch information can decrease, which can make extracting the touch information more difficult. In contrast, reducing the amount of leaked drive signal 917 in sense signal 923 can increase the proportion of touch information in the sense signal, which can make extracting the touch information easier. Because the amount of drive signal 917 that can be leaked into sense signal 923 can depend on the amount of effective drive-sense capacitance 913, which can depend on CGDdrive 805 and CGDsense 809, one way to reduce the amount of leaked drive signal can be reducing the amount of CGDdrive 805 and CGD sense 809.

Variations in the amount of the leaked drive signal 917 can affect touch sensing because, for example, unaccounted variations in sense signal 923 levels can appear as noise in the sense signals. For example, the amount of drive signal 917 leaked from a particular region of drive Vcom to a particular region of sense Vcom can vary depending on variations in the amount of effective drive-sense capacitance 913, which can depend on variations of CGDdrive 805 and CGDsense 809, which can result from the changing individual luminances of a large number of pixels and the particular inversion scheme being used. Moreover, the luminances of the display pixels in particular drive and sense regions can vary over time. Therefore varying amounts of drive signals can be leaked, which can cause erratic variations in sense signals 923, which can essentially be viewed as noise. In this regard, one way to reduce this noise can be reducing the variance in CGDdrive 805 and CGDsense 809.

As described above, the gate-to-drain capacitance, such as CGDdrive 805 and CGDsense 809, of a pixel TFT can depend on the voltage difference between the gate and the drain of the TFT. FIGS. 10-13 illustrate an example method of operating a touch screen using different voltage modes for a display phase and a touch sensing phase according to various embodiments. The different voltage modes can, for example, be used to adjust a voltage-dependent characteristic, such as gate-to-drain capacitance, of a component of the touch screen, such as a pixel TFT, to reduce or eliminate errors in touch sensing.

Figure 10:
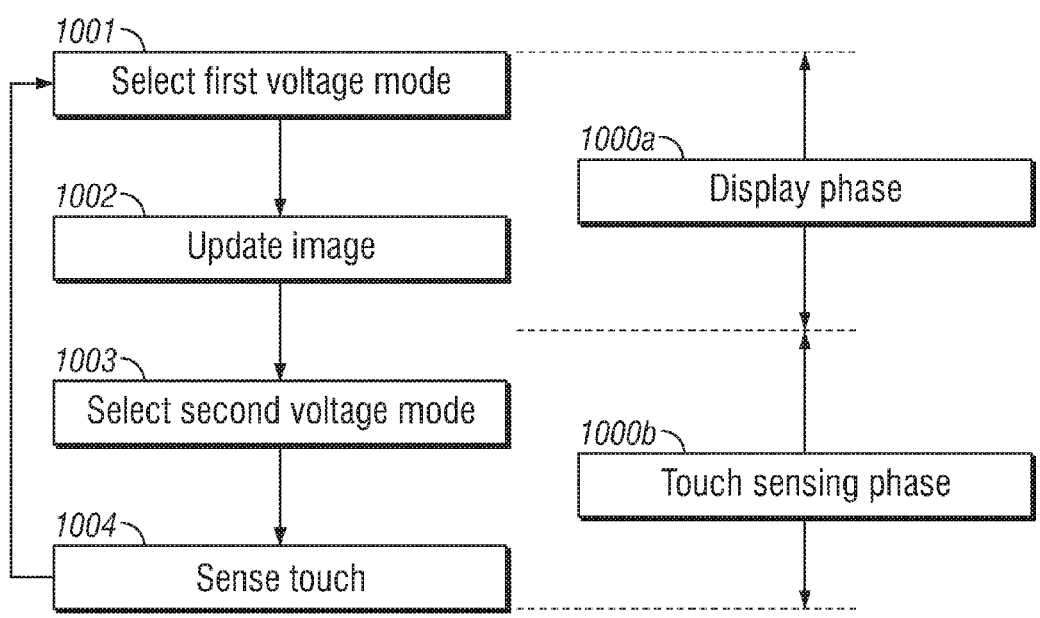
FIG. 10 is a flowchart of the example method of operating a touch screen using different voltage modes for a display phase and a touch sensing phase according to various embodiments.

FIG. 10 is a flowchart of the example method of operating a touch screen using different voltage modes for a display phase and a touch sensing phase according to various embodiments. In a display phase 1000a of a touch screen operation, a first voltage mode can be selected (1001), and the image displayed on the touch screen can be updated (1002). During the display phase, one or more voltages can be applied at voltage levels corresponding to the first voltage mode. In a touch sensing phase 1000b, a second voltage mode can be selected (1003), and touch sensing can be performed (1004). During the touch sensing phase, the one or more voltages can be applied at voltage levels corresponding to the second voltage mode. Applying one or more voltages at different levels during a display phase and a touch sensing phase can allow a voltage-dependent characteristic of one or more components of the touch screen to be adjusted independently in the display and touch sensing phases. In this way, for example, individual component characteristics can be adjusted to better suit the operation of one or both of the display and touch sensing phases. The voltage or voltages that are applied at different levels can be referred to herein as a multi-mode voltage or multi-mode voltages.

In some embodiments, multi-mode voltages can include VGL and VGH. Touch screen devices, such as computing system 200, which can include a touch screen such as touch screen 550, can apply VGL and VGH at different voltage levels in display phase than the voltage levels applied during a touch sensing phase. In some embodiments, it can be possible to select a VGL voltage level for the touch sensing phase that can help reduce or eliminate the amount and/or the variance of the gate-to-drain capacitance. Example selections of VGL voltages for a display phase and touch sensing phases according to various embodiments will now be described in reference to FIGS. 11-13.

Figure 11:
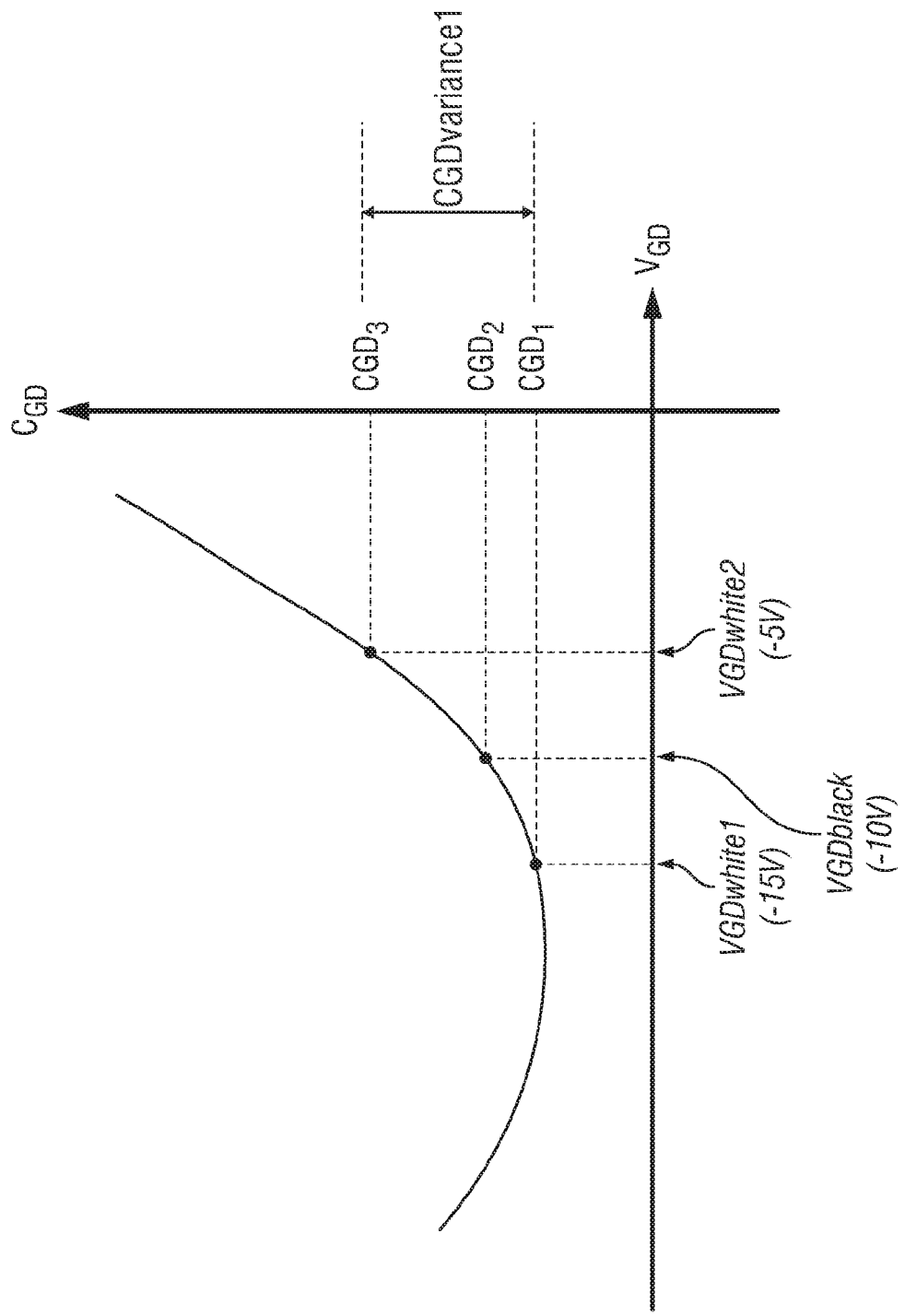
FIG. 11 illustrates an example first voltage mode according to various embodiments.
Figure 12:
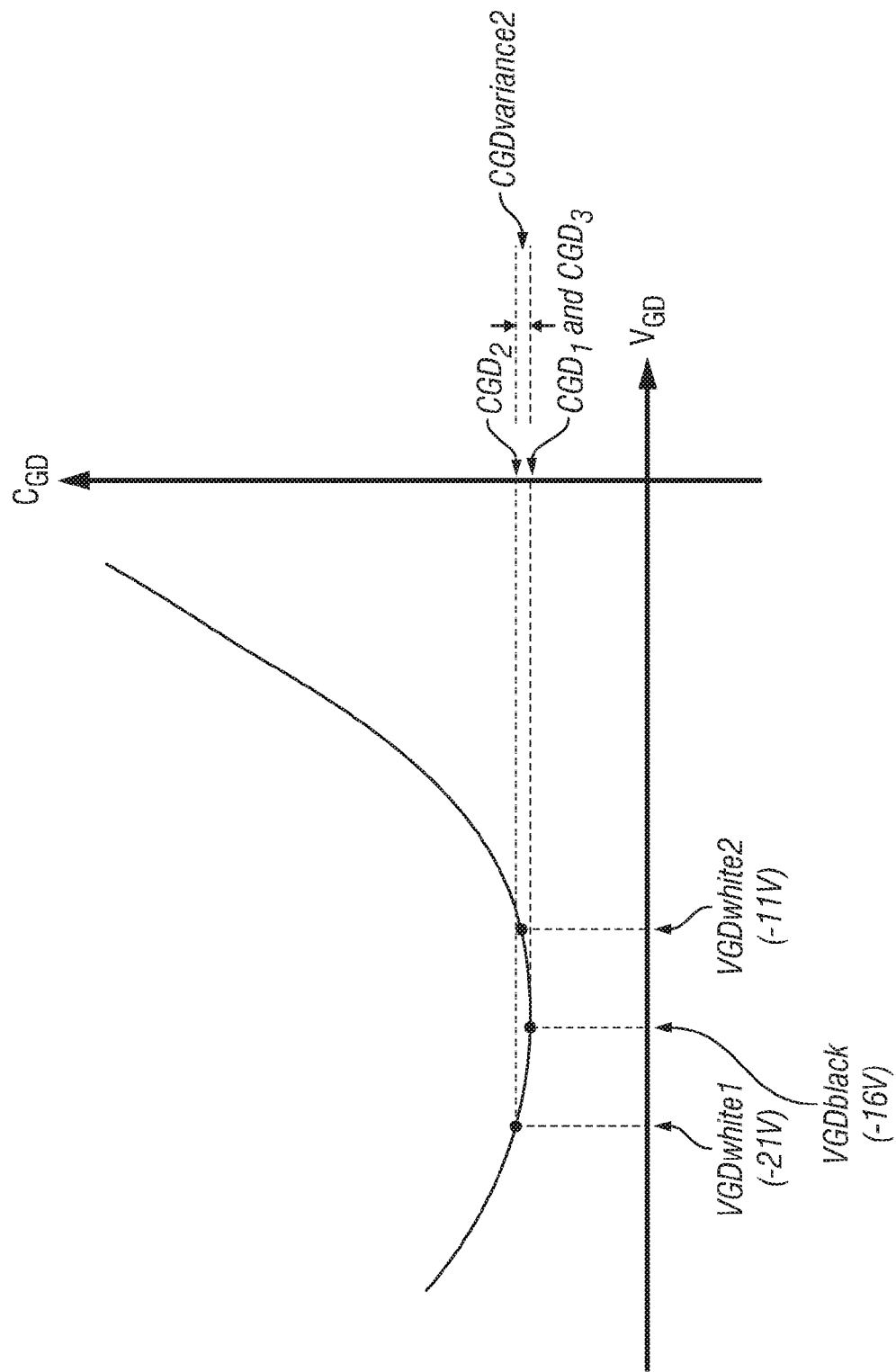
FIG. 12 illustrates an example second voltage mode according to various embodiments.
Figure 13:
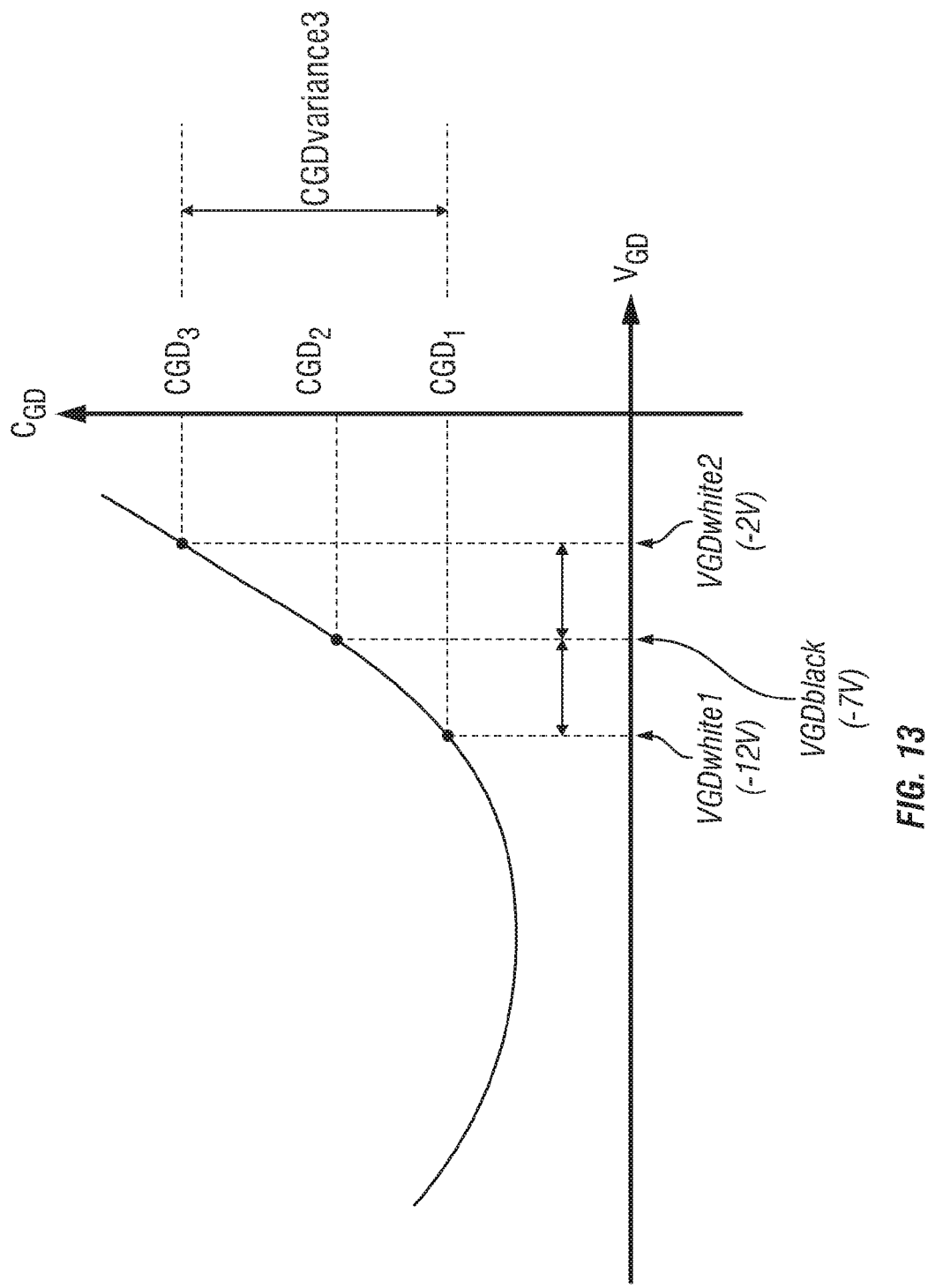
FIG. 13 illustrates another example second voltage mode according to various embodiments.

FIGS. 11-13 illustrate graphs of gate-to-drain capacitance versus gate-to-drain voltage of an example pixel TFT, such as pixel TFT 707, according to various embodiments. Each graph illustrates the same curve, which is an example characteristic curve of the particular pixel TFT. One skilled in the art would understand that other components, such as other TFTs, diodes, etc., can have different characteristic curves.

FIG. 11 illustrates an example first voltage mode according to various embodiments, in which VGL can be set to −10V and VGH can be set to +10V. Therefore, during the display phase, −10V can be applied as VGL and +10V can be applied as VGH. For example, the VGL of −10V can be applied to gate lines of the touch screen to switch pixel TFTs 707 to an off state, and the VGH of +10V can be applied to the gate lines to switch the pixel TFTs to an on state. In this example embodiment, the pixel voltage can range from zero volts (which can correspond to a minimum luminance, e.g., black) to +5V (which can correspond to a maximum luminance, e.g., white). In addition, the pixel electrode voltage can alternate polarity every other image frame, ranging from zero volts (black) to +5V (white) in one image frame, and ranging between zero volts (black) to −5V (white) in the next image frame. Thus, as illustrated in FIG. 11, a gate-to-drain voltage, VGDwhite1, of a white pixel can be −15V [(−10V)−(+5V)] in one frame, and a VGDwhite2 of a white pixel can be −5V [(−10V)−(−5V)] in the next frame. The VGDblack of a black pixel in this example can be −10V [(−10V)−(zero volts)] in all frames.

As shown in the curve of FIG. 11, using this example first voltage mode can result in a variance in gate-to-drain capacitance of CGDvariance1, which ranges from CGD1 (corresponding to a maximum pixel luminance in one frame of the inversion scheme) to CGD3 (corresponding to a maximum pixel luminance in another frame of the inversion scheme).

FIG. 12 illustrates an example second voltage mode according to various embodiments, in which VGL can be set to a level such that the resulting CGD values can be substantially the minimum operational values of pixel TFT 707. In some embodiments, this can be a VGL level that results in a minimum average of CGD values. In the present example shown in FIG. 12, the VGL can be set to a level such that the VGD of a black pixel can be substantially at a minimum point of the CGD vs. VGD curve of pixel TFT 707. In this example, the VGL can be set to approximately −16V, and VGH can be set to approximately +4V. Therefore, during the touch sensing phase, −16V can be applied to all of the gate lines of the touch screen to switch pixel TFTs 707 to an off state. Thus, as illustrated in FIG. 12, a gate-to-drain voltage, VGDwhite1, of a white pixel can be −21V [(−16V)−(+5V)] in one frame, and a VGDwhite2 of a white pixel can be −11V [(−16V)−(−5V)] in the next frame. The VGDblack of a black pixel in this example can be −16V [(−16V)−(zero volts)] in all frames.

As shown in the curve of FIG. 12, using this example second voltage mode can result in a variance in gate-to-drain capacitance of CGDvariance2, which ranges from CGD2 (corresponding to a minimum pixel luminance in all frames of the inversion scheme) to CGD2 and CGD3 (corresponding to a maximum pixel luminance in all frames of the inversion scheme). CGDvariance2 can be smaller than CGDvariance1, which can result in less variance in the amount of drive signal that can leak into the sense signal through error mechanism 800. In this way, using a different voltage level for VGL during touch sensing can reduce or eliminate a sense signal noise associated with a voltage-dependent characteristic of a component of a touch screen.

In addition, it can be seen from a comparison of FIGS. 11 and 12 that, on average, the example second voltage mode can result in lower CGD values than the example first voltage mode. In other words, using the second voltage mode during the touch sensing phase can reduce or eliminate an amount of drive signal leakage because the capacitive coupling between gates and drains of pixel TFTs 707 can be reduced.

FIG. 13 illustrates another example second voltage mode according to various embodiments, in which VGL can be set to a level such that an operational range of CGD values can be substantially symmetrical about a reference value of CGD. In this example, the operational range of CGD values can lie along a substantially linear portion of the CGD vs. VGD curve of pixel TFT 707. In this example, the VGL can be set to approximately −7V, and VGH can be set to approximately +13V. Therefore, during the touch sensing phase, −7V can be applied to all of the gate lines of the touch screen to switch pixel TFTs 707 to an off state. Thus, as illustrated in FIG. 13, a gate-to-drain voltage, VGDwhite1, of a white pixel can be −12V [(−7V)−(+5V)] in one frame, and a VGDwhite2 of a white pixel can be −2V [(−7V)−(−5V)] in the next frame. The VGDblack of a black pixel in this example can be −7V [(−7V)−(zero volts)] in all frames.

As shown in the curve of FIG. 13, using this example second voltage mode can result in a variance in gate-to-drain capacitance of CGDvariance3, which ranges from CGD1 (corresponding to a maximum pixel luminance in one frame of the inversion scheme) to CGD3 (corresponding to a maximum pixel luminance in another frame of the inversion scheme). While CGDvariance3 can be larger than CGDvariance1, the variance in drive signal leakage that results from the range of CGD values that can occur during one frame of the inversion scheme can offset the variance in drive signal leakage that results from the range of CGD values during the other frame of the inversion scheme. In particular, in one frame of the inversion scheme, pixel voltages can range from zero volts to +5V, which corresponds to VGD values ranging from VGDblack to VGDwhite1, which further corresponds to CGD values ranging from CGD2 (black) to CGD1 (white). Likewise, CGD values in the other inversion frame can range from CGD2 (black) to CGD3 (white). Therefore, if the luminance of a pixel does not change between image frames, an average CGD value of the two frames can be approximately CGDblack, regardless of the particular luminance of the pixel. For example, a persisting white pixel can have a CGD value of CGD1 in one frame and can have a CGD value of CGD3 in the next frame, resulting in an average CGD value of approximately CGD2 (black). Likewise, the CGD values of pixels at any luminance can average to CGD2 (black) over frames in which the pixel luminance does not change. Thus, for example, if a persisting image is displayed, the average CGD values of each pixel can be approximately the same (e.g., CGD2 (black)). In many display applications, the number of times a pixel's luminance stays the same, or approximately the same, between frames can be far greater than the number of times the pixel's luminance changes drastically between frames. Therefore, in many applications, using a second voltage mode according to the present example embodiment can result in reduced average variance of CGD, which can reduce or eliminate associated noise in the sense signal, for example. In this way, using a different voltage level for VGL during touch sensing can reduce or eliminate a sense signal noise associated with a voltage-dependent characteristic of a component of a touch screen.

It should be noted that in these example embodiments, the difference between VGL and VGH (i.e., 20V) can be maintained in both the first and second voltage modes. In this way, for example, certain circuit components and systems, such as logical systems, can maintain their operational state. However, in some embodiments, the difference between VGL and VGH can be different for different voltage modes.

In some embodiments, selection of the first and second voltage modes can be performed by a single system, such as LCD driver 234 in the example touch screen device of FIG. 2. In this regard, LCD driver 234 can select and apply a first voltage mode, update the image, and select and apply a second voltage mode. Touch controller 206 can then perform touch sensing while LCD driver 234 is applying the voltages at the levels corresponding to the second voltage mode. In some embodiments, selection of the first and second voltage modes can be performed by distinct systems, and control of the voltage application can alternate between the two systems.

Figure 14:
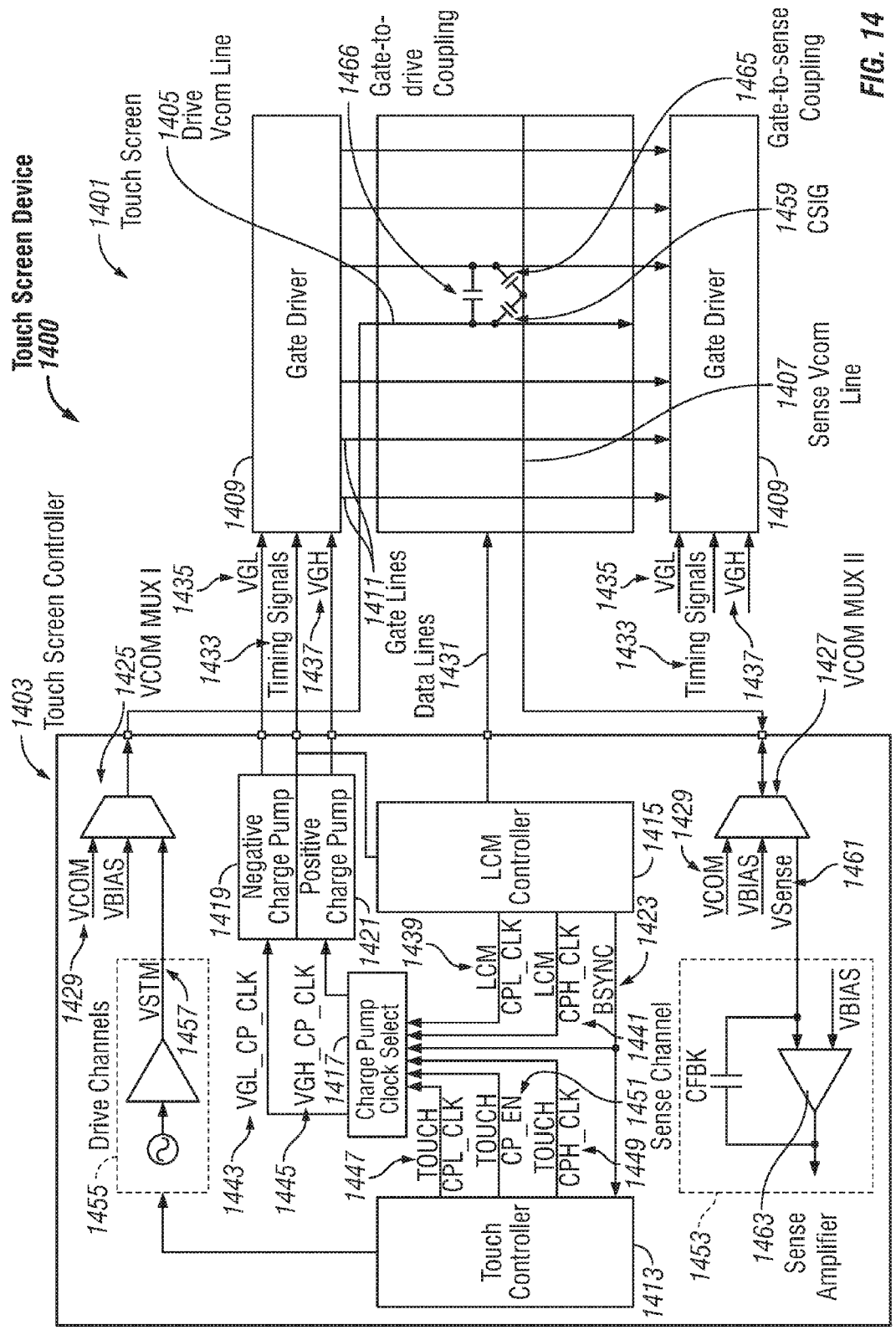
FIG. 14 illustrates an example touch screen device that can include a combined touch sensing and display controller according to various embodiments.

FIG. 14 illustrates an example touch screen device 1400 that can include a combined touch sensing and display controller in which the selection and application of first and second voltages can be performed by two distinct systems according to various embodiments. FIG. 14 illustrates a touch screen device 1400, which can include a touch screen 1401 and a touch screen controller 1403. Touch screen 1401 can be an integrated touch screen, such as touch screen 550, in which the common electrodes can operate as a common voltage source during a display phase and can operate as drive lines and sense lines during a touch sensing phase. For the sake of clarity, only one drive Vcom line 1405 and on sense Vcom line 1407 are illustrated in the figure. Touch screen 1401 can also include gate drivers 1409 and gate lines 1411.

Touch screen controller 1403 can be a combined touch and display controller, and can include both a touch controller 1413, which can control the selection and application of the voltages at the second voltage level settings and can perform the touch sensing operation of touch screen 1401, and a display controller, such as LCM controller 1415, which can control selection and application of the voltages at the first voltage level settings and can perform the display operation of the touch screen. In this regard, some of the components of touch screen controller 1403 can be shared between LCM controller 1415 and touch controller 1413. For example, a charge pump system, including a charge pump clock selector 1417, a negative charge pump 1419, and a positive charge pump 1421, can be used during both the display and touch phases, as described in more detail below. A synchronization signal (BSYNC) 1423 between LCM controller 1415 and touch controller 1413 can be used to synchronize the display and touch sensing operations. For example, the display phase can correspond to a low BSYNC 1423 signal, and the touch phase can correspond to a high BSYNC 1423 signal.

During the display phase, a first Vcom multiplexer (VCOM MUX I) 1425 and a second Vcom multiplexer (VCOM MUX II) 1427 can connect the common electrodes (not shown) of touch screen 1401 to a Vcom voltage source (not shown) controlled by LCM controller 1415, thus allowing LCM controller 1415 to apply a Vcom voltage (VCOM) 1429 to the common electrodes. LCM controller 1415 can update the image displayed on touch screen 1401 by applying data voltages to data lines 1431 while scanning through gate lines 1411. LCM controller 1415 can scan the gate lines using timing signals 1433 to control gate drivers 1409, and charge pump clock selector 1417 can select the LCM controller to control negative charge pump 1419 and positive charge pump 1421 to apply a VGL 1435 (low gate voltage) and a VGH 1437 (high gate voltage) to gate lines 1411 through gate drivers 1409. Specifically, charge pump clock selector 1417 can select signals LCM_CPL_CLK 1439 and LCM_CPH_CLK 1441 from LCM controller 1415 as low charge pump clock signal (VGL_CP_CLK) 1443 and high charge pump clock signal (VGH_CP_CLK) 1445, respectively, to control negative charge pump 1419 and positive charge pump 1421. For the sake of clarity, a single charge pump system is shown in FIG. 14, although it is to be understood that a second charge pump system can be used to apply voltages to additional gate drivers 1409 on an opposite side of touch screen 1401, such that some gate lines 1411 can be driven from one side of the touch screen and other gate lines 1411 can be driven from the other side of the touch screen. In this example embodiment, a first voltage mode can be selected during the display phase, and LCM controller 1415 can apply the multi-mode voltages (VGL and VGH in this embodiment), such that the pixel TFTs (not shown) can be switched off with VGL 1435 (e.g., −10 V) and switched on with VGH 1437 (e.g., +10 V).

A second voltage mode can be selected during the touch sensing phase, and touch controller 1413 can apply the multi-mode voltages (VGL and VGH) such that the pixel TFTs (not shown) can be switched off with VGL 1435 (e.g., −16 V if using example second voltage mode of FIG. 12, or −7 V if using example second voltage mode of FIG. 13). In this example embodiment, the charge pump system can be used by touch controller 1413. Specifically, charge pump clock selector 1417 can select signals TOUCH_CPL_CLK 1447 and TOUCH_CPH_CLK 1449 from touch controller 1413 as low charge pump clock signal (VGL_CP_CLK) 1443 and high charge pump clock signal (VGH_CP_CLK) 1445, respectively, to control negative charge pump 1419 and positive charge pump 1421, to apply VGL 1435 and VGH 1437 to gate lines 1411 through gate drivers 1409. In this example embodiment, all of the gate lines can be held at the low gate voltage according to the second voltage mode in order to switch off all of the pixel TFTs during the touch sensing phase. In other words, VGL 1435 can be applied to all of the gate lines during the touch sensing phase in the present example embodiment. Touch controller 1413 can also send a signal TOUCH_CP_EN 1451 to charge pump clock selector 1417 to select whether the charge pumps are enabled or disabled.

VCOM MUX II 1427 can connect the common electrodes associated with each sense Vcom line 1407 to a corresponding sense channel 1453. Touch controller 1413 can scan through the drive Vcom lines 1405 by controlling VCOM MUX I 1425 to connect the common electrodes associated with the drive Vcom lines to drive channels 1455 in a particular scanning order while applying drive signals (VSTM) 1457 to drive Vcom lines 1405. Each drive signal 1457 can be coupled to a sense Vcom line 1407 through a signal capacitance (CSIG) 1459 that can vary depending on the proximity of a touch object, such as a finger, resulting in a sense signal on the sense Vcom line. Touch controller 1413 can receive sense signals (VSENSE) 1461 from sense Vcom lines 1407 through sense channels 1453. Each sense channel 1453 can include a sense amplifier 1463 that amplifies sense signals 1461. The amplified sense signals can be further processed by touch controller 1413 to determine touches on touch screen 1401.

In this example embodiment, a gate-to-drive coupling 1466 and a gate-to-sense coupling 1465 can be reduced or eliminated using the second voltage mode, as described above, to reduce or eliminate corresponding errors in touch sensing.

In some embodiments, the voltage or voltages that are applied at different voltage levels in the touch and display phases can include reference voltages for the touch screen device. For example, VGL and VGH can be the lowest and highest voltages, respectively, in some touch screen devices, and can be used as system reference voltages. Although embodiments of this disclosure have been fully described with reference to the accompanying drawings, it is to be noted that various changes and modifications including, but not limited to, combining features of different embodiments, omitting a feature or features, etc., as will be apparent to those skilled in the art in light of the present description and figures.

For example, one or more of the functions of computing system 200 described above can be performed by firmware stored in memory (e.g. one of the peripherals 204 in FIG. 2) and executed by touch processor 202, or stored in program storage 232 and executed by host processor 228. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Example embodiments may be described herein with reference to a Cartesian coordinate system in which the x-direction and the y-direction can be equated to the horizontal direction and the vertical direction, respectively. However, one skilled in the art will understand that reference to a particular coordinate system is simply for the purpose of clarity, and does not limit the direction of the elements to a particular direction or a particular coordinate system. Furthermore, although specific materials and types of materials may be included in the descriptions of example embodiments, one skilled in the art will understand that other materials that achieve the same function can be used. For example, it should be understood that a "metal layer" as described in the examples below can be a layer of any electrically conductive material.

In some embodiments, the drive lines and/or sense lines can be formed of other elements including, for example other elements already existing in typical LCD displays (e.g., other electrodes, conductive and/or semiconductive layers, metal lines that would also function as circuit elements in a typical LCD display, for example, carry signals, store voltages, etc.), other elements formed in an LCD stackup that are not typical LCD stackup elements (e.g., other metal lines, plates, whose function would be substantially for the touch sensing system of the touch screen), and elements formed outside of the LCD stackup (e.g., such as external substantially transparent conductive plates, wires, and other elements). For example, part of the touch sensing system can include elements similar to known touch panel overlays.

In this example embodiment, each sub-pixels can be a red (R), green (G) or blue (B) sub-pixel, with the combination of all three R, G and B sub-pixels forming one color display pixel. Although this example embodiment includes red, green, and blue sub-pixels, a sub-pixel may be based on other colors of light or other wavelengths of electromagnetic radiation (e.g., infrared) or may be based on a monochromatic configuration.

What is claimed is:

1. An integrated touch screen device comprising:
a touch screen including a plurality of display pixels;
a multi-mode power system configured to:
select a first voltage, the first voltage corresponding to a display phase, the selection of the first voltage resulting in a touch screen component operating at a first capacitance and at a second capacitance, the first capacitance being less than a third capacitance of the touch screen component, and the second capacitance being greater than the third capacitance, the third capacitance being between the first capacitance and the second capacitance on a capacitance curve of the touch screen component, wherein the first, second and third capacitances are between a first part and a second part of the touch screen component, and
select a second voltage, the second voltage corresponding to a touch sensing phase, the second voltage being different than the first voltage, the selection of the second voltage resulting in the touch screen component operating at a fourth capacitance and at a fifth capacitance, the fourth capacitance and the fifth capacitance being greater than a sixth capacitance of the touch screen component, the sixth capacitance being between the fourth capacitance and the fifth capacitance on the capacitance curve of the touch screen component, wherein the fourth, fifth and sixth capacitances are between the first part and the second part of the touch screen component;
a display system configured to update an image displayed by the display pixels during the display phase, wherein the first voltage is applied to the touch screen during the updating of the image; and
a touch sensing system configured to sense touch during the touch sensing phase, wherein the second voltage is applied to the touch screen during the sensing of touch.

2. The integrated touch screen device of claim 1, wherein the first voltage and the second voltage are applied to the touch screen component.

3. The integrated touch screen device of claim 2, wherein the touch screen component has a voltage-dependent capacitance.

4. The integrated touch screen device of claim 3, wherein:
the touch screen component includes a pixel transistor of each display pixel,
the touch screen further includes a plurality of gate lines, each gate line connected to a gate of the pixel transistor in each display pixel, and
the second voltage is applied to a gate line that switches the pixel transistor to an off state.

5. The integrated touch screen device of claim 3, wherein a single voltage source applies the first voltage and the second voltage.

6. The integrated touch screen device of claim 5, wherein the single voltage source is controlled by the display system during the display phase and is controlled by the touch sensing system during the touch sensing phase.

7. The integrated touch screen device of claim 3, wherein the application of the first voltage to the touch screen component results in the first and second capacitances of the touch screen component, the application of the second voltage to the touch screen component results in the fourth and fifth capacitances of the touch screen component, and the first and second capacitances are greater than the fourth and fifth capacitances.

8. The integrated touch screen device of claim 3, the voltage dependence of the capacitance corresponding to a curve representing capacitance values versus voltage values, wherein the application of the first voltage to the touch screen component results in an operational range of the touch screen component in a first portion of the curve, the application of the second voltage to the touch screen component results in an operational range of the touch screen component in a second portion of the curve, the second portion of the curve being more linear than the first portion of the curve.

9. The integrated touch screen device of claim 3, the voltage dependence of the capacitance corresponding to a curve representing capacitance values versus voltage values, wherein the application of the first voltage to the touch screen component results in an operational range of the touch screen component in a first portion of the curve, the application of the second voltage to the touch screen component results in an operational range of the touch screen component in a second portion of the curve, wherein an average of capacitance values in the second portion of the curve is less than an average of capacitance values in the first portion of the curve.

10. The integrated touch screen device of claim 9, wherein the touch screen component includes a pixel transistor in each display pixel, the capacitance value includes a gate-to-drain capacitance of the pixel transistor, and the application of the second voltage to the pixel transistor sets the gate-to-drain capacitance of the pixel transistor to a minimum capacitance of the curve.

11. A method of operating an integrated touch screen device including a touch screen with a plurality of display pixels, the method comprising:
selecting a first voltage, the first voltage corresponding a display phase, the selection of the first voltage resulting in a touch screen component operating at a first capacitance and at a second capacitance, the first capacitance being less than a third capacitance of the touch screen component, and the second capacitance being greater than the third capacitance, the third capacitance being between the first capacitance and the second capacitance on a capacitance curve of the touch screen component, wherein the first, second and third capacitances are between a first part and a second part of the touch screen component;
updating an image displayed by the display pixels during the display phase, wherein the first voltage is applied to the touch screen during the updating of the image;
selecting a second voltage, the second voltage corresponding to a touch sensing phase, the second voltage being different than the first voltage, the selection of the second voltage resulting in the touch screen component operating at a fourth capacitance and at a fifth capacitance, the fourth capacitance and the fifth capacitance being greater than a sixth capacitance of the touch screen component, the sixth capacitance being between the fourth capacitance and the fifth capacitance on the capacitance curve of the touch screen component, wherein the fourth, fifth and sixth capacitances are between the first part and the second part of the touch screen component; and
sensing touch during the touch sensing phase, wherein the second voltage is applied to the touch screen during the sensing of touch.

12. The method of claim 11, wherein the first voltage and the second voltage are applied to the touch screen component.

13. The method of claim 12, wherein the touch screen component has a voltage-dependent capacitance.

14. The method of claim 13, wherein:
the touch screen component includes a pixel transistor of each display pixel,
the touch screen further includes a plurality of gate lines, each gate line connected to a gate of the pixel transistor in each display pixel, and
the second voltage is applied to a gate line that switches the pixel transistor to an off state.

15. The method of claim 13, wherein a single voltage source applies the first voltage and the second voltage.

16. The method of claim 15, wherein the single voltage source is controlled by display system during the display phase and is controlled by a touch sensing system during the touch sensing phase.

17. The method of claim 13, wherein the application of the first voltage to the touch screen component results in the first and second capacitances of the touch screen component, the application of the second voltage to the touch screen component results in the fourth and fifth capacitances of the touch screen component, and the first and second capacitances are greater than the fourth and fifth capacitances.

18. The method of claim 13, the voltage dependence of the capacitance corresponding to a curve representing capacitance values versus voltage values, wherein the application of the first voltage to the touch screen component results in an operational range of the touch screen component in a first portion of the curve, the application of the second voltage to the touch screen component results in an operational range of the touch screen component in a second portion of the curve, the second portion of the curve being more linear than the first portion of the curve.

19. The method of claim 13, the voltage dependence of the capacitance corresponding to a curve representing capacitance values versus voltage values, wherein the application of the first voltage to the touch screen component results in an operational range of the touch screen component in a first portion of the curve, the application of the second voltage to the touch screen component results in an operational range of the touch screen component in a second portion of the curve, wherein an average of capacitance values in the second portion of the curve is less than an average of capacitance values in the first portion of the curve.

20. The method of claim 19, wherein the touch screen component includes a pixel transistor in each display pixel, the capacitance value includes a gate-to-drain capacitance of the pixel transistor, and the application of the second voltage to the pixel transistor sets the gate-to-drain capacitance of the pixel transistor to a minimum capacitance of the curve.

21. The integrated touch screen device of claim 1, wherein the first and second voltages comprise gate line voltages applied to a gate line of a pixel transistor in a first display pixel of the plurality of display pixels.

22. The method of claim 11, wherein the first and second voltages comprise gate line voltages applied to a gate line of a pixel transistor in a first display pixel of the plurality of display pixels.

23. The integrated touch screen device of claim 1, wherein the first, second, third, fourth, fifth and sixth capacitances correspond to respective voltages applied across the first part and the second part of the touch screen component.

24. The method of claim 11, wherein the first, second, third, fourth, fifth and sixth capacitances correspond to respective voltages applied across the first part and the second part of the touch screen component.

25. The integrated touch screen device of claim 1, wherein:
the touch screen component comprises a pixel transistor,
the first part of the touch screen component comprises a gate of the pixel transistor, and
the second part of the touch screen component comprises a drain of the pixel transistor.

26. The method of claim 11, wherein:
the touch screen component comprises a pixel transistor,
the first part of the touch screen component comprises a gate of the pixel transistor, and
the second part of the touch screen component comprises a drain of the pixel transistor.

27. The integrated touch screen device of claim 1, wherein the first, second, third, fourth, fifth and sixth capacitances are total capacitances between the first part and the second part of the touch screen component.

28. The method of claim 11, wherein the first, second, third, fourth, fifth and sixth capacitances are total capacitances between the first part and the second part of the touch screen component.

29. The integrated touch screen device of claim 1, wherein:
the first part of the touch screen component includes a first electrically contiguous portion,
the second part of the touch screen component includes a second electrically contiguous portion, and
the first, second, third, fourth, fifth and sixth capacitances are between the first electrically contiguous portion and the second electrically contiguous portion.

30. The method of claim 11, wherein:
the first part of the touch screen component includes a first electrically contiguous portion,
the second part of the touch screen component includes a second electrically contiguous portion, and
the first, second, third, fourth, fifth and sixth capacitances are between the first electrically contiguous portion and the second electrically contiguous portion.

* * * * *